United States Patent
Kalmutzki

(10) Patent No.: US 12,403,807 B2
(45) Date of Patent: Sep. 2, 2025

(54) PNEUMATIC BLADDER ARRANGEMENT FOR A SEAT AND METHOD FOR MANUFACTURING THE SAME

(71) Applicant: SCHUKRA BERNDORF GMBH, Berndorf (AT)

(72) Inventor: Martin Kalmutzki, Spalt (DE)

(73) Assignee: SCHUKRA BERNDORF GMBH, Berndorf (AT)

( * ) Notice: Subject to any disclaimer, the term of this patent is extended or adjusted under 35 U.S.C. 154(b) by 0 days.

(21) Appl. No.: 17/904,862

(22) PCT Filed: Feb. 22, 2021

(86) PCT No.: PCT/EP2021/054322
§ 371 (c)(1),
(2) Date: Aug. 23, 2022

(87) PCT Pub. No.: WO2021/170536
PCT Pub. Date: Sep. 2, 2021

(65) Prior Publication Data
US 2023/0104360 A1  Apr. 6, 2023

(30) Foreign Application Priority Data
Feb. 24, 2020 (EP) .................... 20158990

(51) Int. Cl.
*B60N 2/60* (2006.01)
*B60N 2/90* (2018.01)
(Continued)

(52) U.S. Cl.
CPC ............ *B60N 2/914* (2018.02); *B60N 2/976* (2018.02); *A47C 7/142* (2018.08); *A47C 20/048* (2013.01); *B60N 2/665* (2015.04)

(58) Field of Classification Search
CPC ........ B60N 2/914; B60N 2/976; B60N 2/665; B60N 2/7082; A47C 7/0244;
(Continued)

(56) References Cited

U.S. PATENT DOCUMENTS

| | | |
|---|---|---|
| 3,232,305 A | 2/1966 | Groeber |
| 3,306,538 A | 2/1967 | McCracken, Jr. |

(Continued)

FOREIGN PATENT DOCUMENTS

| | | |
|---|---|---|
| CN | 1629504 A | 6/2005 |
| CN | 101103181 A | 1/2008 |

(Continued)

OTHER PUBLICATIONS

Chinese Patent Office Search Report for Application No. 2021800155157 dated May 22, 2024 (8 pages with English translation).

(Continued)

*Primary Examiner* — Syed A Islam
(74) *Attorney, Agent, or Firm* — Michael Best & Friedrich LLP

(57) ABSTRACT

A pneumatic bladder arrangement comprises a plurality of bladders arranged in an array of rows and columns, wherein the array comprises a first array section and a second array section with the first and second array sections each comprising at least one row of bladders. The pneumatic bladder arrangement may be used in a support apparatus for a seat, in particular for a backrest of a seat.

31 Claims, 21 Drawing Sheets

(51) Int. Cl.
*A47C 7/14* (2006.01)
*A47C 20/04* (2006.01)
*B60N 2/66* (2006.01)

(58) Field of Classification Search
CPC . A47C 7/03216; A47C 7/03283; A47C 7/142; A47C 7/446; A47C 7/467; A47C 20/048; A47C 723/065; A47C 27/08; A47C 27/00; A47C 27/086
See application file for complete search history.

(56) References Cited

U.S. PATENT DOCUMENTS

| | | |
|---|---|---|
| 3,339,668 A | 9/1967 | Trainor |
| 3,390,674 A | 7/1968 | Jones |
| 3,444,897 A | 5/1969 | McCleod, Jr. |
| 3,536,084 A | 10/1970 | Dorsey et al. |
| 3,566,862 A | 3/1971 | Schuh et al. |
| 3,587,568 A | 6/1971 | Thomas |
| 3,680,574 A | 8/1972 | Price |
| 3,720,218 A | 3/1973 | Drzewiecki |
| 3,734,116 A | 5/1973 | Trask, II |
| 3,958,602 A | 5/1976 | Manion et al. |
| 4,225,989 A | 10/1980 | Corbett et al. |
| 4,258,753 A | 3/1981 | Limpaecher |
| 4,373,553 A | 2/1983 | Drzewiecki |
| 4,538,701 A | 9/1985 | Lowery et al. |
| 4,549,574 A | 10/1985 | Taylor |
| 4,565,259 A | 1/1986 | Stoll |
| 4,572,327 A | 2/1986 | Dean |
| 4,747,467 A | 5/1988 | Lyon et al. |
| 4,756,230 A | 7/1988 | Shew |
| 4,840,425 A | 6/1989 | Noble |
| 5,266,754 A | 11/1993 | Swift |
| 5,273,406 A | 12/1993 | Feygin |
| 5,276,291 A | 1/1994 | Norris |
| 5,659,158 A | 8/1997 | Browning et al. |
| 5,677,518 A | 10/1997 | Fischer et al. |
| 5,921,636 A | 7/1999 | Roberts |
| 5,996,731 A | 12/1999 | Czabala et al. |
| 6,131,696 A | 10/2000 | Esslinger |
| 6,572,570 B1 | 6/2003 | Burns et al. |
| 6,722,467 B1 | 4/2004 | Kusche et al. |
| 6,767,331 B2 | 7/2004 | Stouffer et al. |
| 6,860,157 B1 | 3/2005 | Yang et al. |
| 6,916,300 B2 | 7/2005 | Hester et al. |
| 6,976,507 B1 | 12/2005 | Webb et al. |
| 7,037,280 B1 | 5/2006 | Burns et al. |
| 7,096,888 B1 | 8/2006 | Thurston et al. |
| 7,128,082 B1 | 10/2006 | Cerretelli et al. |
| 7,445,083 B2 | 11/2008 | Wu |
| 8,043,238 B1 | 10/2011 | Tamura et al. |
| 8,430,202 B1 | 4/2013 | Mason et al. |
| 8,550,208 B1 | 10/2013 | Potokar |
| 8,770,229 B2 | 7/2014 | Gopalan et al. |
| 9,119,705 B2 | 9/2015 | Parish et al. |
| 9,573,679 B2 | 2/2017 | Golling et al. |
| 9,618,150 B2 | 4/2017 | Bauer et al. |
| 9,989,159 B2 | 6/2018 | Winkler et al. |
| 10,362,882 B2 * | 7/2019 | Yu ................... A47C 27/082 |
| 10,724,549 B2 | 7/2020 | Le et al. |
| 11,672,356 B2 * | 6/2023 | Wornell .............. A47C 7/021 5/709 |
| 2003/0070870 A1 | 4/2003 | Reynolds |
| 2004/0097854 A1 | 5/2004 | Hester et al. |
| 2005/0067218 A1 | 3/2005 | Bristow et al. |
| 2006/0144638 A1 | 7/2006 | Radatus et al. |
| 2008/0121295 A1 | 5/2008 | Tippetts |
| 2009/0294211 A1 | 12/2009 | Roberts |
| 2011/0108358 A1 | 5/2011 | Edgington et al. |
| 2011/0297479 A1 | 12/2011 | Butler |
| 2012/0055560 A1 | 3/2012 | Gopalan et al. |
| 2012/0143108 A1 | 6/2012 | Boscanyi et al. |
| 2013/0035619 A1 | 2/2013 | Freund |
| 2013/0053102 A1 | 2/2013 | Inagaki |
| 2014/0088468 A1 | 3/2014 | Murison |
| 2014/0299130 A1 | 10/2014 | Librett et al. |
| 2016/0106620 A1 | 4/2016 | Uno et al. |
| 2016/0200228 A1 | 7/2016 | Saren et al. |
| 2016/0213553 A1 | 7/2016 | Oberg et al. |
| 2016/0229320 A1 | 8/2016 | Lem et al. |
| 2018/0104135 A1 | 4/2018 | Lem et al. |
| 2018/0148187 A1 | 5/2018 | Valleroy et al. |
| 2018/0156629 A1 | 6/2018 | Lem et al. |
| 2018/0178694 A1 | 6/2018 | McMillen et al. |
| 2018/0272902 A1 | 9/2018 | Lem et al. |
| 2019/0075932 A1 | 3/2019 | Yu et al. |

FOREIGN PATENT DOCUMENTS

| | | |
|---|---|---|
| CN | 201071958 Y | 6/2008 |
| CN | 101467931 A | 7/2009 |
| CN | 101563531 A | 10/2009 |
| CN | 202314061 U | 7/2012 |
| CN | 202832894 U | 3/2013 |
| CN | 103655147 A | 3/2014 |
| CN | 105383341 A | 3/2016 |
| CN | 106942931 A | 7/2017 |
| CN | 107110079 A | 8/2017 |
| DE | 2536901 A1 | 1/1977 |
| DE | 3240710 A1 | 10/1984 |
| DE | 19509489 A1 | 9/1996 |
| DE | 102015100141 A1 | 7/2016 |
| EP | 1096913 A1 | 5/2001 |
| EP | 1326569 A1 | 7/2003 |
| EP | 1687543 A | 8/2006 |
| EP | 1722356 A1 | 11/2006 |
| EP | 1851447 A1 | 11/2007 |
| EP | 1760262 B1 | 4/2008 |
| EP | 2012022 A2 | 1/2009 |
| EP | 2682612 A2 | 1/2014 |
| EP | 2627914 B1 | 9/2018 |
| EP | 3597477 A1 | 1/2020 |
| JP | H0623306 A | 2/1994 |
| JP | 2002065779 A | 3/2002 |
| JP | 2010125280 A | 6/2010 |
| KR | 20130002774 U | 5/2013 |
| TW | M283636 U | 12/2005 |
| WO | 199709527 A1 | 3/1997 |
| WO | 0067691 A1 | 11/2000 |
| WO | 0234195 A1 | 5/2002 |
| WO | 2005080800 A1 | 9/2005 |
| WO | 2006090130 A1 | 8/2006 |
| WO | 2010108254 A1 | 9/2010 |
| WO | 2012048853 A1 | 4/2012 |
| WO | 2014039661 A1 | 3/2014 |
| WO | 2015039701 A1 | 3/2015 |
| WO | 2019169471 A1 | 9/2019 |

OTHER PUBLICATIONS

International Search Report and Written Opinion for Application No. PCT/EP2021/054322 dated May 12, 2021 (10 pages).

Goenechea, E. et al. Geräuschminderung in der Hydraulik. O&P—Oelhydraulik und Pneumatik: Zeitschrift Fuer Fluidtechnik, Aktorik, Steuerelektronik und Sensorik, Vereinigte Fachverlage GmbH, DE, vol. JAHR, No. 4/05, Jan. 1, 2004, with English translation of abstract, 8 pages.

* cited by examiner

PNEUMATIC BLADDER ARRANGEMENT FOR A SEAT AND METHOD FOR MANUFACTURING THE SAME

The present invention relates to a pneumatic bladder arrangement for a seat, in particular to a pneumatic bladder arrangement for any of a backrest, a leg cushion, a footrest, a headrest or a neck portion of a seat, and to a seat comprising such a pneumatic bladder arrangement as well as a method for manufacturing the same.

PRIOR ART

Seat comprising inflatable bladders are known in the art, in particular for automotive applications. The inflatable bladders are generally used for adjusting the shape of the seat, and in particular the backrest, the leg portion, the footrest, the headrest or a neck portion of a seat, to the particular shape and preferences of a given user. For instance, lumbar adjustment can be obtained by controlling the inflation amount of an inflatable bladder positioned in the lumbar region.

In some cases, by providing a plurality of bladders and alternating inflation, a massage-like movement of the seat can be implemented.

The known solutions however are expensive and bulky. In particular, the bladders are usually connected to a pump, or to valves, by means of flexible tubes, which must be connected to the various bladders and then routed through the seat. As the number of bladder increases, to increase the possibility of adapting the seat to the user and/or to increase the massage-like movements, the number of tubes increases, so does their costs and complexity of routing and assembling.

It is therefore an object of the invention to provide a pneumatic bladder arrangement which can overcome those disadvantages.

SUMMARY

In particular a pneumatic bladder arrangement can comprise a plurality of bladders arranged in an array of rows and columns, wherein the array can comprise a first array section and a second array section with the first and second array sections each comprising at least one column of bladders. Thanks to this implementation, the two sections can be used for configuring the position and/or massaging two substantially symmetrical parts of a user's body, such as the two halves of a back, or the two legs, etc.

In some applications, the first array section and the second array section of the array can each comprise at least two rows of bladders. In some applications, each column of the array can comprise at least five bladders. Thanks to those implementations, the number of possible configurations and massage patterns can be increased.

In some applications, the bladders of the first array section can be formed between two flexible sheets of material connecting the bladders of the first array section, and the bladders of the second array section can be formed between two flexible sheets of material connecting the bladders of the second array section. In some applications, the bladders of the first array section and the bladders of the second array section can be formed between the respective two flexible sheets of material by welding the respective two sheets of material to each other. Thanks to those implementations, it is possible to manufacture the bladders in a cost-effective and configurable manner, as various methods for welding flexible sheets of material to each other can be highly configurable.

In some applications, the bladders of the first array section and the bladders of the second array section can be formed between the same flexible sheets of material. Thanks to this implementation, it is possible to implement the first and second section in a single manufacturing step.

In some applications, at least one bladder of the first array section can be connected to a first fluid supply connection for supplying fluid to at least one of the bladders of the first array section, the first fluid supply connection can be formed between the two flexible sheets of material of the first array section, and at least one bladder of the second array section can be connected to a second fluid supply connection for supplying fluid to at least one of the bladders of the second array section, the second fluid supply connection can be formed between the two flexible sheets of material of the second array section. Thanks to this implementation, it is possible to obtain also the fluid supply connection from the same sheets of material used for the bladders.

In some applications, at least one bladder of the first array section can be connected to at least one bladder of the second array section by a fluid interconnection. Thanks to this implementation, it is possible to reduce the number of fluid supply connections.

In some applications, the fluid interconnection can be formed between the two flexible sheets of material. Thanks to this implementation, it is possible to obtain also the fluid interconnection from the same sheets of material used for the bladders.

In some applications, the fluid interconnection can extend through the bladders mainly in a row direction. Thanks to this implementation, it is possible to have the bladders closer to each other in the column direction, and/or allow a particularly advantageous interconnection for several massage patterns.

In some applications, the pneumatic bladder arrangement can be configured as support arrangement for any of a backrest, a cushion, a footrest, a headrest or a neck portion of a seat such that, when installed in the backrest, cushion, footrest, headrest or neck portion of the seat, the array of bladders covers most of the backrest, cushion, footrest, headrest or neck portion. Thanks to this implementation, it is possible to obtain an increased area which can be configured or massaged.

In some applications, at least one of the first array section and the second array section can comprise bladders that are grouped in a group of at least four bladders arranged in two adjacent rows and in two adjacent columns of the array. Thanks to this implementation, the groups can be inflated and deflated in a particularly advantageous manner, as well as providing more configuration possibilities.

In some applications, the at least four bladders in the group can be spaced from one another by a distance that is less than a distance to an adjacent bladder not being part of the group. Thanks to this implementation, the pressure points can be focused on the areas which are more in contact with the body of the user, while leaving other areas for ventilation.

In some applications, the first array section and the second array section each can comprise at least two groups of four bladders. In some applications, the first array section and the second array section each can comprise at least one additional group of two bladders arranged in one row of the array. Thanks to those implementations, the possible configurations and massage patterns can be increased.

In some applications, the bladders of the plurality of bladders can have a similar shape. In some applications, the bladders of the plurality of bladders can each have a rectangular shape. Thanks to those implementations, it is possible to simplify manufacturing and/or routing of the fluid lines, as well as obtaining a similar amount of pressure on the various pressure points.

In some applications, at least one bladder of the plurality of bladders can have an area comprised between 4 cm$^2$ and 200 cm$^2$. Thanks to this implementation, it is possible to obtain a sufficient pressure point while enabling a plurality of such pressure points to be implemented.

In some applications, the bladders of the first array section can each have a first fluid port to allow each bladder of the first array section to be inflated with fluid or to be deflated independently of the other bladders of the first array section; and/or the bladders of the second array section can each have a first fluid port to allow each bladder of the second array section to be inflated with fluid or to be deflated independently of the other bladders of the second array section (S2). Thanks to this implementation, it is possible to independently control bladders in a given section.

In some applications, at least one of the bladders of the first array section can have a second fluid port in connection with a first fluid port of one of the bladder of the second array section; and/or at least one of the bladders of the second array section can have a second fluid port in connection with a first fluid port of one of the bladder of the first array section. Thanks to this implementation, it is possible to reduce the number of fluid supply connections.

In some applications, at least one element for the supply or distribution of fluid to the plurality of bladders can provided or formed between two flexible sheets of material by welding the respective two sheets of material to each other. Thanks to this implementation, it is possible to manufacture the element for the supply or distribution of fluid to the plurality of bladders in a simple and effective manner, potentially with the same manufacturing step of the bladders.

In some applications, the pneumatic bladder arrangement can further comprise a plurality of first overlapping bladders respectively overlapping the plurality of bladders. In some applications, the pneumatic bladder arrangement can further comprise a plurality of second overlapping bladders respectively overlapping the plurality of first overlapping bladders. Thanks to those implementations, it is possible to increase the difference in thickness between the inflated and the deflated configuration of the bladders, and thus the range of pressure values which can be applied on the body of the user.

A support apparatus for a seat can comprise any of the pneumatic bladder arrangement above; a fluid source for supplying a fluid to the plurality of bladders of the pneumatic bladder arrangement; and a control device for controlling the supply of the fluid to the plurality of bladders. Thanks to this implementation, it is possible to control the level of fluid in the bladders.

In some applications, the support apparatus can be configured as a support apparatus for a backrest, a cushion, a footrest, a headrest or a neck portion of the seat. Thanks to this implementation, it is possible to configure and/or massage the respective body parts in contact with those areas.

In some applications, the control device can be configured to control the supply of the fluid to the plurality of bladders such that the bladders of the plurality of bladders are inflated with the fluid and deflated according to a predetermined massage pattern. Thanks to this implementation, it is possible to configure a plurality of massage patterns by controlling how the bladders are inflated and deflated.

In some applications, the massage pattern can be such that it creates a massage effect from a bottom of the pneumatic bladder arrangement to a top of the pneumatic bladder arrangement. In some applications, the massage pattern can be such that it creates a massage effect in a diagonal direction from a bottom of the pneumatic bladder arrangement to a top of the pneumatic bladder arrangement. In some applications, the massage pattern can be such that, when the pneumatic bladder arrangement is installed in the seat, it creates a massage effect in a diagonal direction along muscle fibers of a person sitting on the seat. In some applications, the massage pattern can be such that it creates a rotary massage effect. Thanks to those implementations, a user can select from a variety of massage patterns according to specific personal taste.

A seat can comprise any of the support apparatuses above.

A method of manufacturing a pneumatic bladder arrangement can comprise: positioning a first flexible sheet of material adjacent to a second flexible sheet of material; and welding the first flexible sheet of material to the second flexible sheet of material to form a plurality of bladders arranged in an array of rows and columns, wherein the array comprises a first array section and a second array section with the first and second array sections each comprising at least one column of bladders. In some applications, the method can be configured to manufacture any of the pneumatic bladder arrangements above. Thanks to those implementations, the pneumatic bladder arrangement can be manufactured in a cost-effective and configurable manner.

BRIEF DESCRIPTION OF THE FIGURES

Embodiments of the invention will be described by reference to the following detailed description when considered in connection with the accompanying drawings in which like reference numerals designate like or corresponding parts throughout, wherein:

FIG. 1B schematically illustrates a section view of the pneumatic bladder arrangement 10 along line B-B' of FIG. 1A;

FIG. 1C schematically illustrates a section view of the pneumatic bladder arrangement 10 along line C-C' of FIG. 1A;

FIG. 1E schematically illustrates a section view of the pneumatic bladder arrangement 10 along line E-E' of FIG. 1D;

FIG. 1F schematically illustrates a section view of the pneumatic bladder arrangement 10 along line F-F' of FIG. 1D;

FIG. 4L schematically illustrates a section view of the pneumatic bladder arrangement 40 along line L-L' of FIG. 4K;

FIG. 5B schematically illustrates a section view of the pneumatic bladder arrangement 50 along line B-B' of FIG. 5A;

DETAILED DESCRIPTION OF PREFERRED EMBODIMENTS

In general, the invention relates to a pneumatic bladder arrangement for a seat and to a corresponding method of manufacturing the same.

A pneumatic bladder arrangement 10 will be described with reference to FIGS. 1A-1F.

Figure 1A:
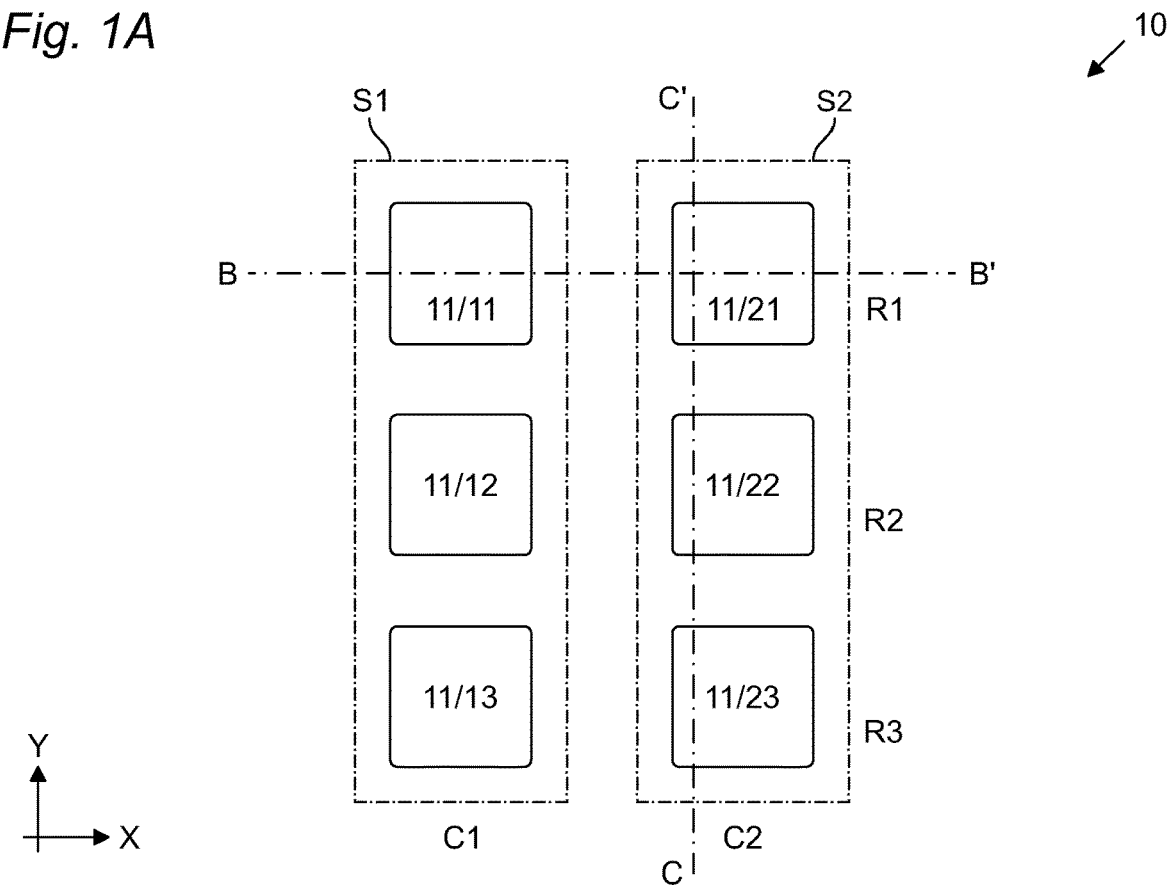
FIG. 1A schematically illustrates a top view of a plurality of bladders of a pneumatic bladder arrangement 10.
Figure 1A:
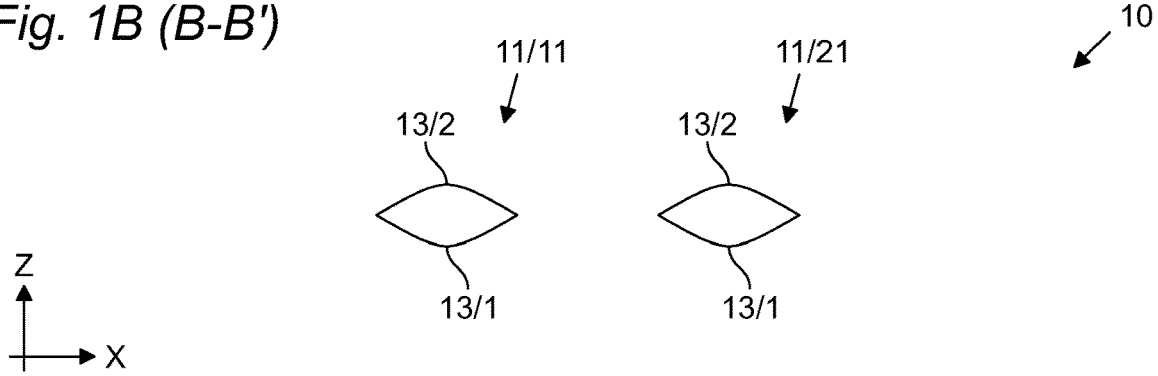
Figure 1A:
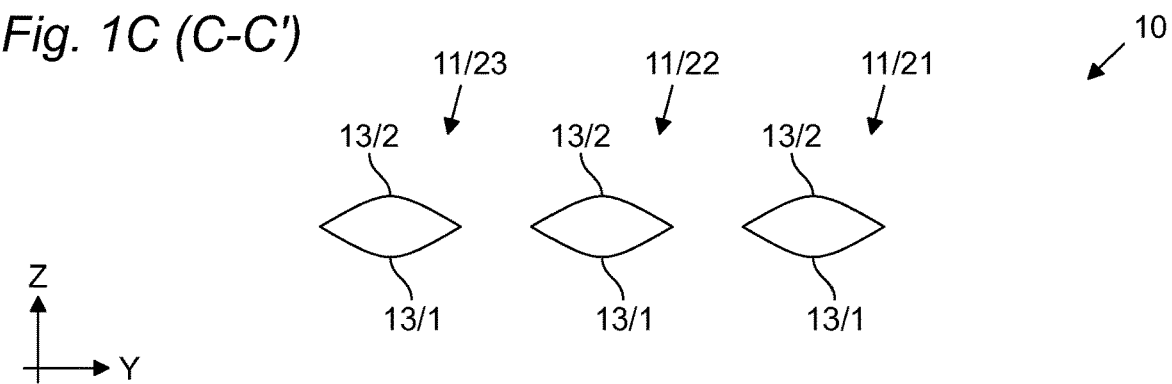

As visible in FIG. 1A, the pneumatic bladder arrangement 10 comprises a plurality of bladders 11/11-11/23 arranged in an array of three rows R1-R3 and two columns C1-C2. It will be clear that other values for the number of rows and columns are possible, as illustrated for instance in the embodiments of FIGS. 2A and 3A. Preferably, some embodiments comprise at least two rows and at least two columns. While in the illustrated embodiments the columns and rows are depicted as being straight lines, in some applications they can also be slightly curved, so as to better follow the anatomy or a user, as will result evident from the following description. In some embodiments, the curve is preferably monotone.

Preferably, the array comprises a first array section S1 and a second array section S2, wherein each of the first array section S1 and second array section S2 comprises at least one column C1-C2 of bladders 11/11-11/23. In some embodiments, each of the first array section S1 and of the second array section S2 comprise at least two rows R1-R3 of bladders.

When the pneumatic bladder arrangement is as back support, this arrangement allows the two sections S1 and S2 to be placed substantially in correspondence with the two halves of a back of a person sitting on a seat in which the pneumatic bladder arrangement is being installed. By having two separate sections S1, S2, it is thus possible to avoid excessive pressure on the spinal column, which can be placed substantially in the space in between the two sections S1, S2. Similarly, when the pneumatic bladder arrangement is as legs support, the two sections S1, S2 can substantially correspond to the position of the two legs while leaving the area in between the legs available, for instance for ventilation purposes.

At the same time, by providing a plurality of rows per section, it is possible to provide different inflation at different positions along the back of a user, thus adapting the seat to the preferences and body shape of the user in an ideal manner while avoiding pressure on the spinal column. Similarly, when used as legs support, either for the upper parts of the legs in a seat or for the lower part in a footrest, the plurality of rows per section enables different inflation at different positions along the legs of a user. Analogous considerations can be made for an application in the headrest or a neck portion.

The bladder arrangement may also comprise additional bladders for the shoulder, neck portion, or head region of a person sitting on the corresponding seat. Furthermore, the bladder arrangement may also comprise bolsters to be arranged on the A-surface of the corresponding seat.

In the embodiment illustrated in FIG. 1A, each column C1-C2 comprises three bladders. The invention is not limited thereto, in some embodiments each column of the array can comprise at least five bladders. Preferably, each column comprises at least two rows and at least one bladder, preferably two, per row. An exemplary illustration is for instance provided in FIG. 2A, where each column comprises six bladders, or in FIG. 3A, where each column comprises seven bladders. By increasing the number of bladders, it is possible for the user to better adapt the seat to a preferred configuration. Moreover, as will become clearer from the following, an increase in the number of bladders increases the number of massage patterns, or types of massage movements, which can be implemented by the pneumatic bladder arrangement.

In some embodiments, the bladders can all have substantially the same size. Specific possible dimensions will be described below, with reference to FIG. 2E. Alternatively, the bladders can have different sizes, preferably as a function of the dimension of the seat in which the pneumatic bladder arrangement 10 is to be incorporated, so that larger seat sections correspond to larger bladder sizes and smaller seat sections correspond to smaller bladder sizes.

While the description provides a substantially regular bladder positioning in a substantially regular array, it will be understood that in some embodiments further additional bladders might be present, which are not positioned along the array. Moreover, in some embodiments, the positioning of the bladders can be substantially along a regular array without being precisely along a regular array. Here the term substantially can be interpreted as meaning that the bladders might be at a position which differs up to 50%, preferably up to 25% from a position along a regular array, where the percentage is expressed as a function of the dimension of the respective bladder along a given direction. For instance, in some embodiments, a bladder having a dimension D1 along the direction X could be placed in an ideal column with the other bladders, or could be placed with a difference of up to 30%, preferably up to 15%, of D, with respect to the ideal position along a straight column.

Moreover, in some embodiments, the position of the columns in different groups can also vary. That is, for instance, the column C1 in a group, for instance group G1/1, can be vertically misaligned with the column C1 in another group, preferably a neighboring group, for instance group G1/2 by up to 50%, preferably up to 25%, of the dimension of a bladder in the row direction. This can be useful, for instance, to widen or restrict the X dimension of the pneumatic bladder arrangement, so as to better comply with human anatomy.

In some embodiments, one or more of the bladders, preferably all, have a generally rectangular shape, preferably a square shape. The invention is however not limited thereto and other shapes, such as elliptical or round, can be implemented. Moreover, while in some embodiments all bladders can have a substantially similar shape, as illustrated, the invention can be implemented with bladders of different shapes.

FIGS. 1B and 1C schematically illustrate a section view of the pneumatic bladder arrangement 10 along line B-B' and C-C' of FIG. 1A, respectively. As can be seen, the bladders of the first array section S1 and the bladders of the second array section S2 can be formed between the respective two flexible sheets 13/1-13/2 of material by welding the respective two sheets 13/1-13/2 of material to each other. Various manners for welding the sheets can be implemented, such as hot welding, laser welding, HF welding, etc. The welding can be operated at the illustrated contour of the bladders.

In some embodiments, the bladders 11/11-11/13 of the first array section S1 and the bladders 11/21-11/23 of the second array section S2 can be formed between the same flexible sheets 13/1-13/2 of material. This provides the advantage that more bladders of the pneumatic bladder arrangement can be manufactured at the same time. The invention is however not limited thereto and a first set of flexible sheets 13/1-13/2 of material can be used for the first section S1 while a second set of flexible sheets 13/1-13/2 of material can be used for the second section S2.

Figure 1D:
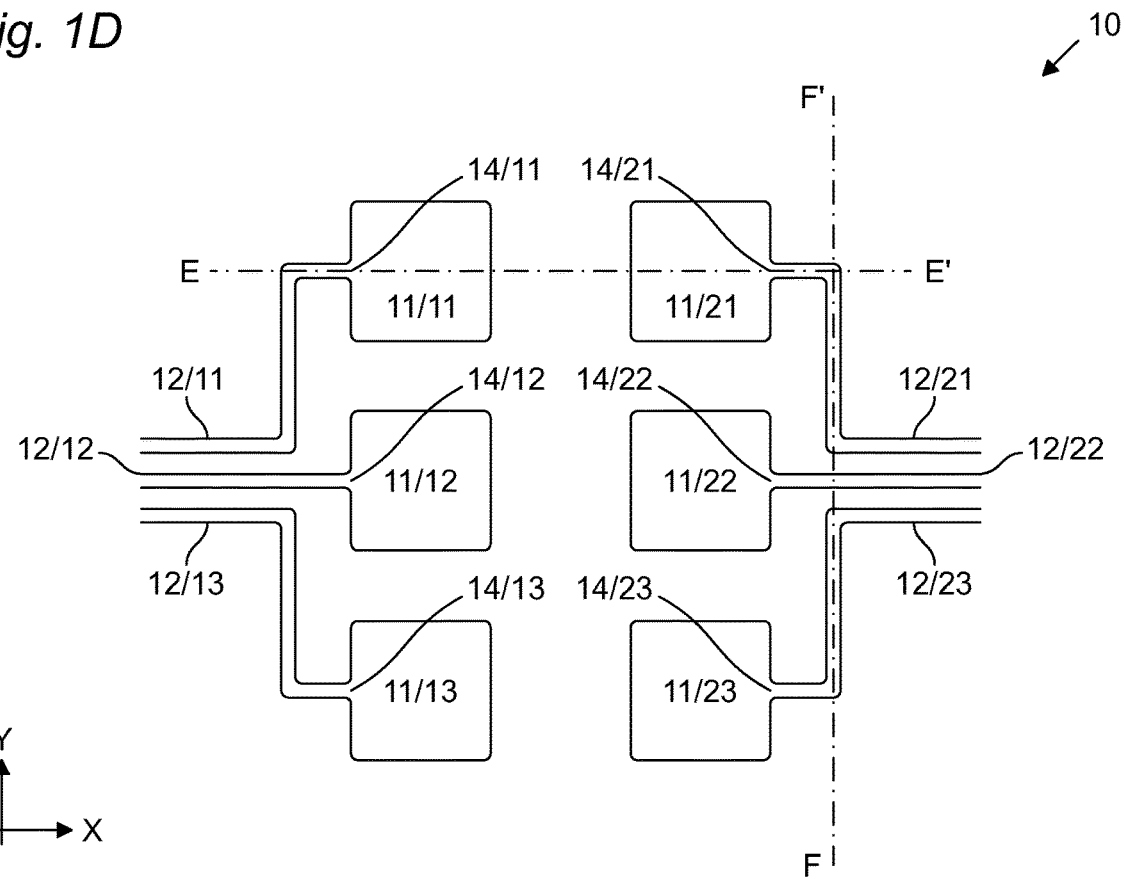
FIG. 1D schematically illustrates a top view of the pneumatic bladder arrangement 10 further comprising a plurality of fluid supply connections.
Figure 1D:
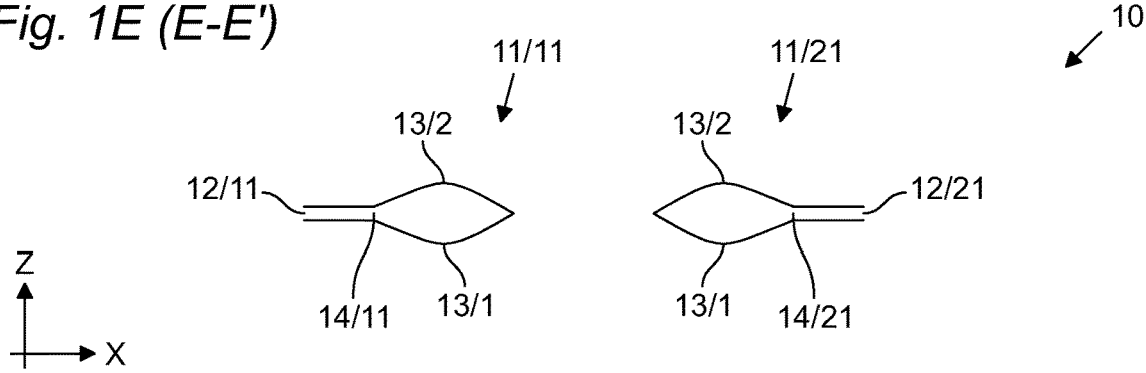
Figure 1D:
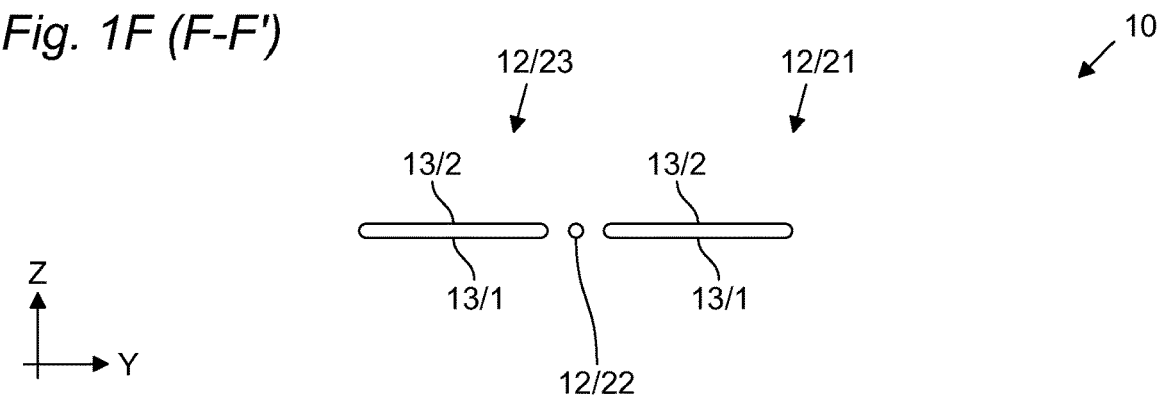

FIG. 1A provides a schematic representation of the placement of the bladders 11/11-11/23. FIG. 1D additionally illustrates a plurality of fluid supply connections 14/11-14/23, which can be used to inflate and deflate the bladders 11/11-11/23. As will be clear from the following, the invention is not limited to the specifically illustrated routing of the fluid supply connections 14/11-14/23. For instance, an alternative possible routing is illustrated in FIG. 2B.

In general, at least one bladder 11/11-11/13 of the first array section S1 is connected to a first fluid supply connection 12/11-12/13 for supplying fluid to at least one of the bladders of the first array section S1. Similarly, at least one bladder 11/21-11/23 of the second array section S2 is connected to a second fluid supply connection 12/21-12/23 for supplying fluid to at least one of the bladders of the second array section S2. In the illustrated embodiment, the number of fluid supply connection 12/11-12/13 corresponds to the number of bladders in the first section S1 and the number of second supply connection 22/11-22/13 corresponds to the number of bladders in the second section. The invention is however not limited thereto and it will be possible to have a number of fluid supply connections which is advantageously lower than the number of bladders, as it is for instance illustrated in FIG. 2A.

The first fluid supply connection 12/11-12/13 can be formed between the two flexible sheets 13/1-13/2 of material of the first array section S1. Similarly, the second fluid supply connection 12/21-12/23 can be formed between the two flexible sheets 13/1-13/2 of material of the second array section S2. In preferred embodiments, the two flexible sheets 13/1-13/2 of the first section S1 are the same of the two flexible sheets 13/1-13/2 of the second section. The invention is however not limited thereto and it is possible to use different flexible sheets 13/1-13/2 for the first and second sections S1-S2.

Thanks to the implementation of the fluid supply connections 12/11-12/23 by means of the flexible sheets 13/1-13/2, it is advantageously possible to manufacture the fluid supply connections 12/11-12/23 and the bladders with a reduced number of manufacturing steps, preferably with a single manufacturing step.

In the embodiment illustrated in FIG. 1D the fluid supply connections 12/11-12/13 of the first section S1 substantially extend toward a side of the first section S1 opposite to the placement of the second section S2. Similarly, the fluid supply connections 12/21-12/23 of the second section S2 substantially extend toward a side of the second section S2 opposite to the placement of the second section S1. This provides the advantage that the fluid supply connections 12/11-12/23 extend externally to the pneumatic bladder arrangement while leaving the space in between the first and second section S1, S2 substantially free from fluid supply connections 12/11-12/23, thus relieving pressure from the spinal column. Moreover, by extending externally to the pneumatic bladder arrangement, the two groups of fluid supply connections 12/11-12/23 can be made as long as wished. This allows manufacturing of fluid supply connections 12/11-12/23 with a sufficient length for subsequent routing through the seat, for instance in order to reach a remotely arranged pump or control valve. Additionally, by extending externally to the pneumatic bladder arrangement, the two groups of fluid supply connections 12/11-12/23 can be used to keep the pneumatic bladder arrangement in place, for instance by using the two groups of fluid supply connections as anchoring point, or by providing anchoring means on the two groups of fluid supply connections.

In particular, according to an embodiment of the invention, the bladders may all be connected to a controllable valve, so that they can all be individually controlled, i.e., inflated/deflated. More details on the control of the bladders will be provided in the following, in particular with respect to FIG. 6.

In order to allow independent inflation/deflation of the bladders through the respective fluid supply connections, each of the bladders has a fluid port. In the embodiment of FIG. 1D, each of the bladders of the first array section S1 has a first fluid port 14/11-14/13. Similarly, each of the bladders of the second array section S2 has a first fluid port 14/21-14/23. In embodiments in which the fluid supply connections 12/11-12/23 extend externally to the pneumatic bladder arrangement, the first fluid port the bladders is preferably substantially placed toward the exterior of the pneumatic bladder arrangement, so as to simplify the routing of the fluid supply connections 12/11-12/23. The present invention is however not limited to embodiments having all first fluid ports 14/11-14/23 placed externally in this manner, as will become clearer with the description of FIG. 2A.

Figure 2A:
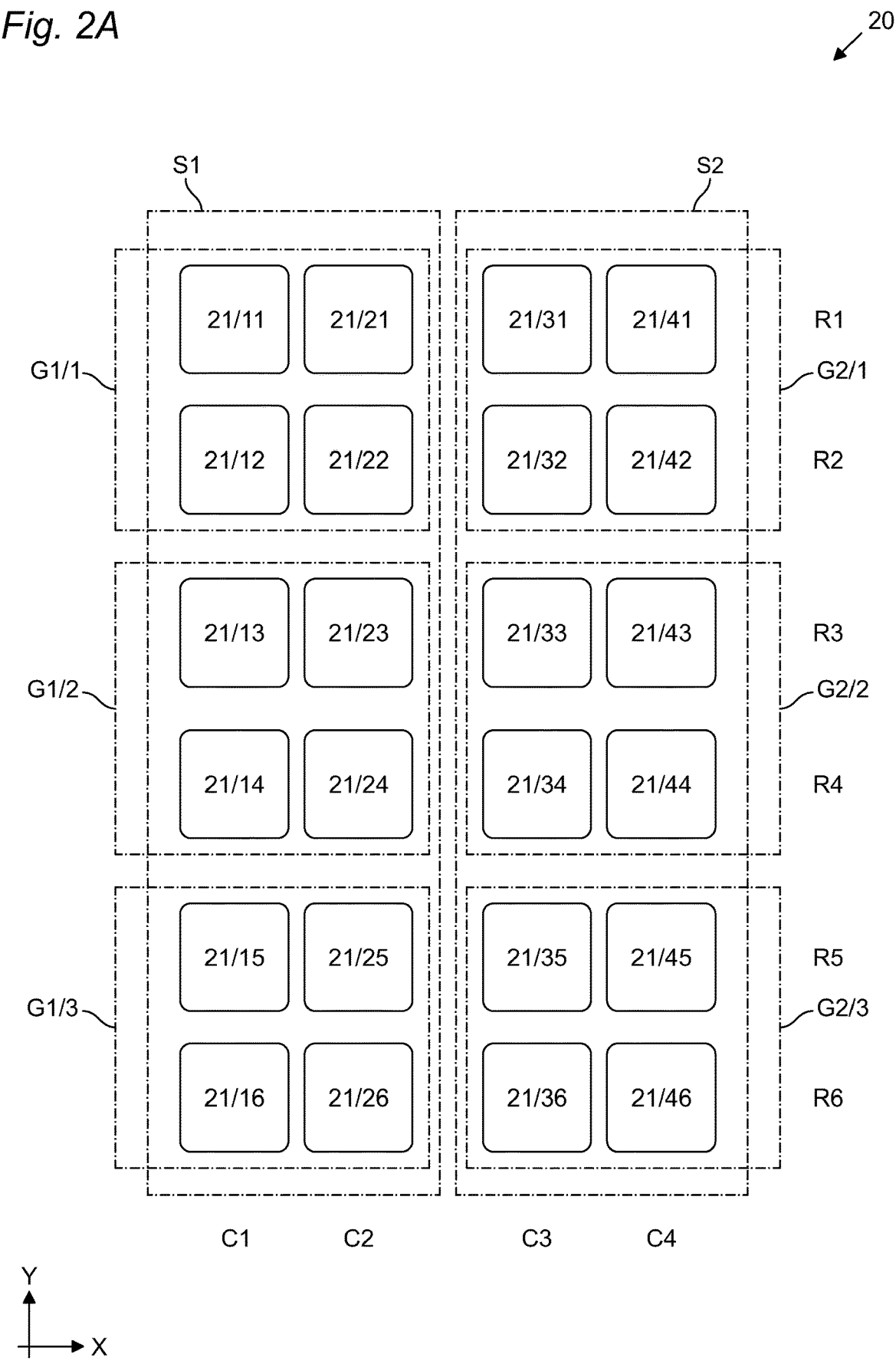
FIG. 2A schematically illustrates a top view of a plurality of bladders of a pneumatic bladder arrangement 20.
Figure 2B:
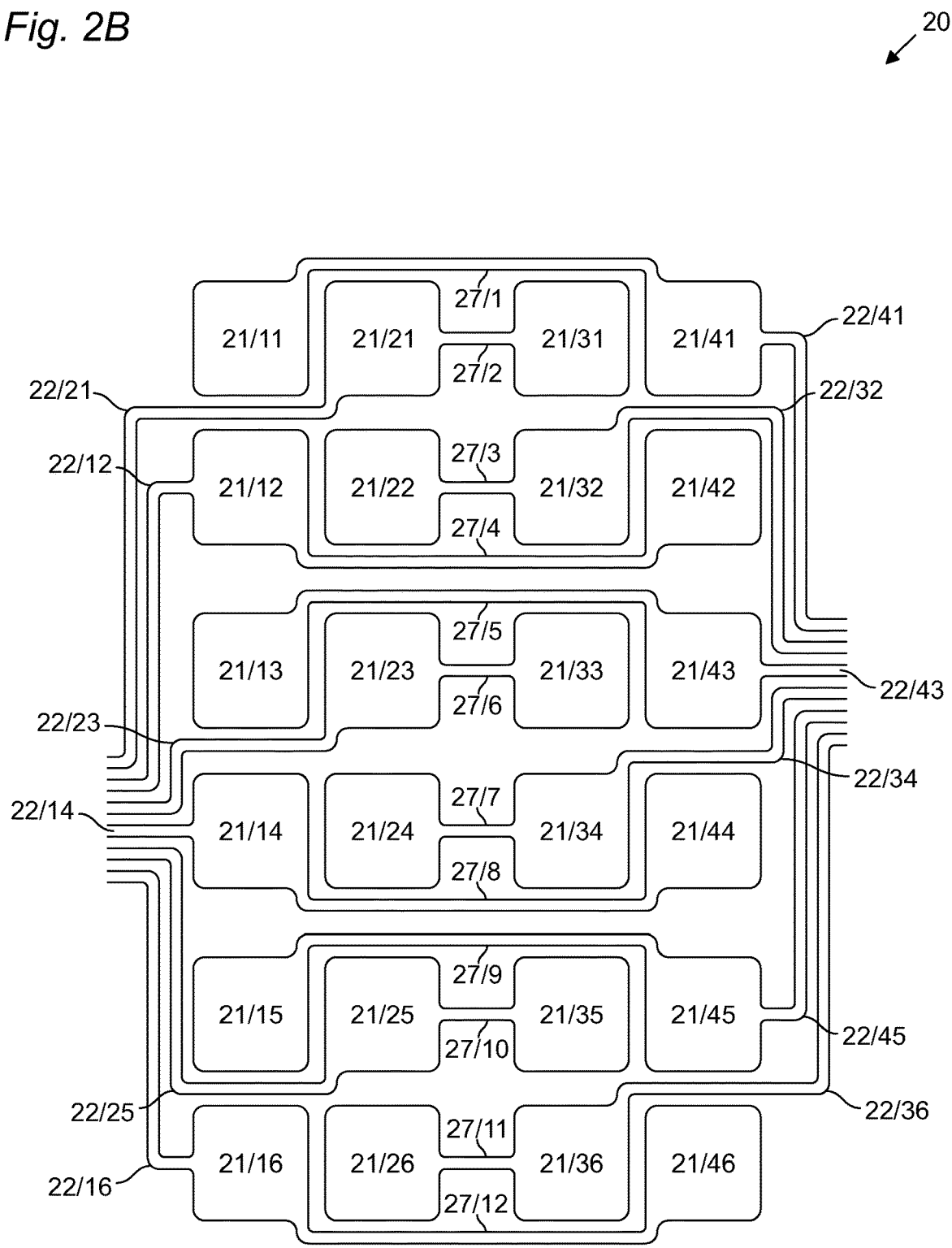
FIG. 2B schematically illustrates a top view of the pneumatic bladder arrangement 20 further comprising a plurality of fluid supply connections.

FIG. 2A schematically illustrates a top view of a plurality of bladders 21/11-21/46 of a pneumatic bladder arrangement 20. FIG. 2B schematically illustrates a top view of the pneumatic bladder arrangement 20 further comprising a plurality of fluid supply connections 22/21-22/36 and fluid interconnections 27/1-27/12. Unless otherwise specified the features and advantages of the pneumatic bladder arrangement 10 can also be applied to the pneumatic bladder arrangement 20.

The pneumatic bladder arrangement 20 differs from pneumatic bladder arrangement 10 due to the presence of the fluid interconnections 27/1-27/12. As will become clearer from the following description, the fluid interconnections 27/1-27/12 allow an advantageous control of the bladders 21/11-21/46 with a reduced number of fluid supply connections 22/21-22/36. More specifically, with respect to the pneumatic bladder arrangement 10, the number of fluid supply connections 22/21-22/36 in the pneumatic bladder arrangement 20 can be lower than the number of bladders 21/11-21/46. Thanks to the embodiment of FIG. 2A, it is also possible that only one or more of the bladders is controllable. As will become evident from the following, for example, one bladder of the first bladder section S1 and one bladder of the second bladder section S2 may be connected to each other by an interconnection, so that they can be controlled in pairs, requiring only one valve for both bladders.

It is thus possible to provide and/or form at least one element for the supply or distribution of fluid to the plurality of bladders between two flexible sheets 13/1-13/2 of material by welding the respective two sheets of material to each other. For instance, the at least one element for the supply of fluid can be any of fluid supply connections and the at least one element for the distribution of fluid can be any of fluid interconnections.

As visible in FIG. 2A, the pneumatic bladder arrangement 20 comprises first and second array sections S1, S2. At least one of the first array section S1 and of the second array section S2 comprises bladders 21/11-21/46 that are grouped in a group G1/1-G2/3 of at least four bladders arranged in two adjacent rows R1-R6 and in two adjacent columns C1-C4 of the array. For instance, group G1/1 on rows R1-R2 and columns C1-C2 comprises bladders 21/11-21/21 and 21/12-22/12

Preferably, the first array section S1 and the second array section S2 each comprise at least two groups G1/1-G2/3 of four bladders 21/11-21/46, even more preferably at least three. Preferably, the pneumatic bladder arrangement 20 comprises the same number of groups in the first section S1 as in the second section S2. In the illustrated embodiment, six such groups G1/1-G2/3 are illustrated. It will be however be clear that the invention is not limited thereto.

Figure 2C:
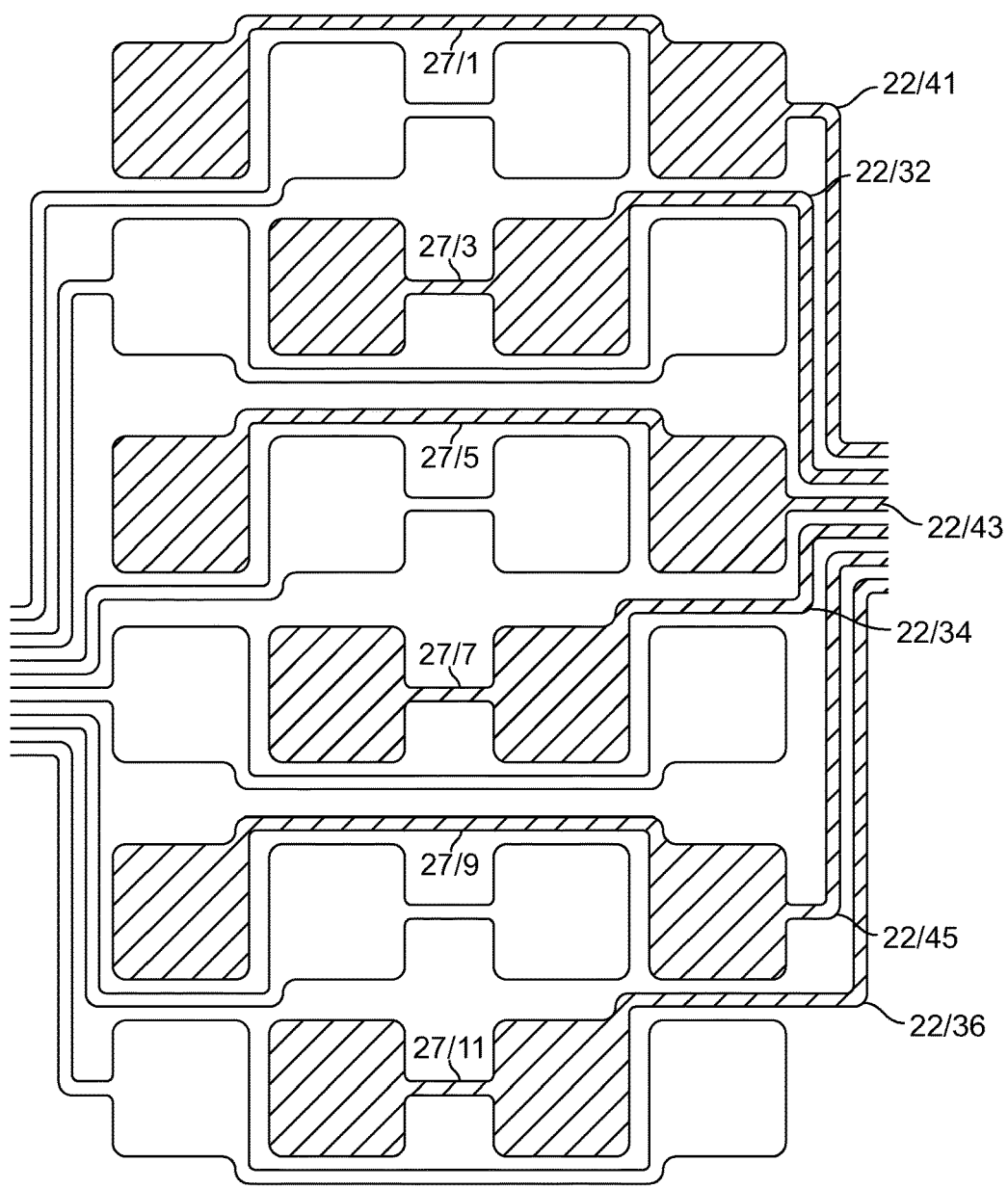
FIGS. 2C and 2D schematically illustrate how bladders of the pneumatic bladder arrangement 20 can be connected to the plurality of fluid supply connections.
Figure 2D:
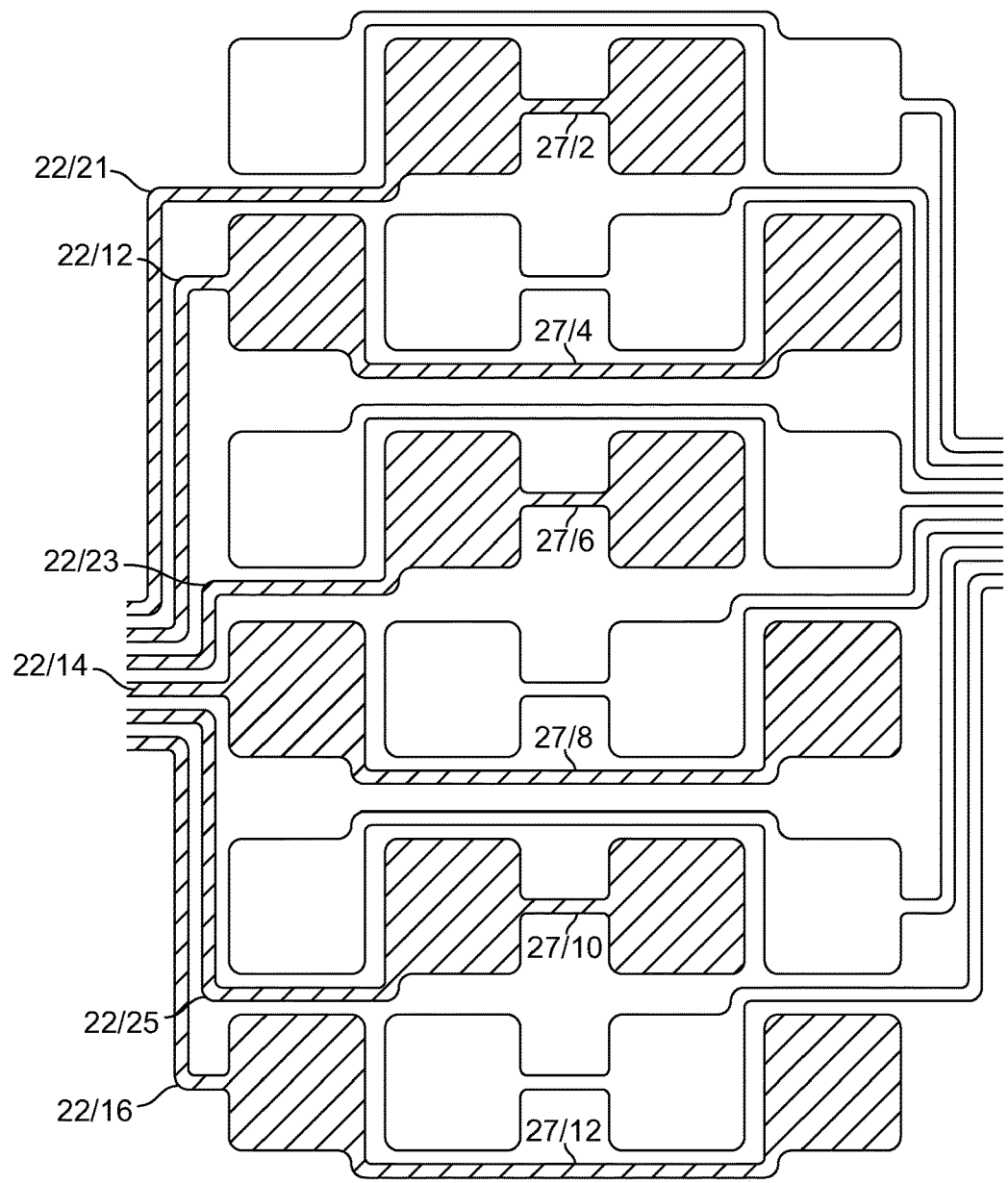
Figure 2E:
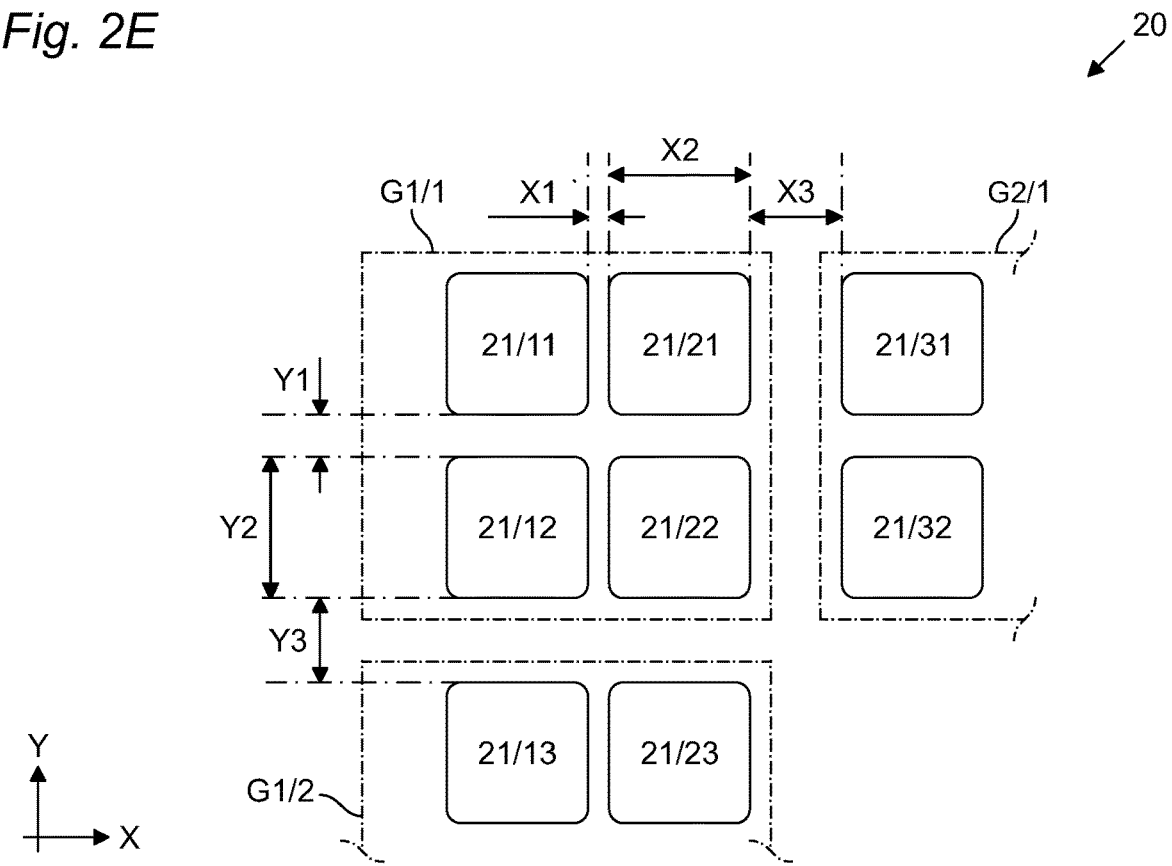
FIGS. 2E and 2F schematically illustrate a portion of FIGS. 2A and 2B respectively.
Figure 2F:
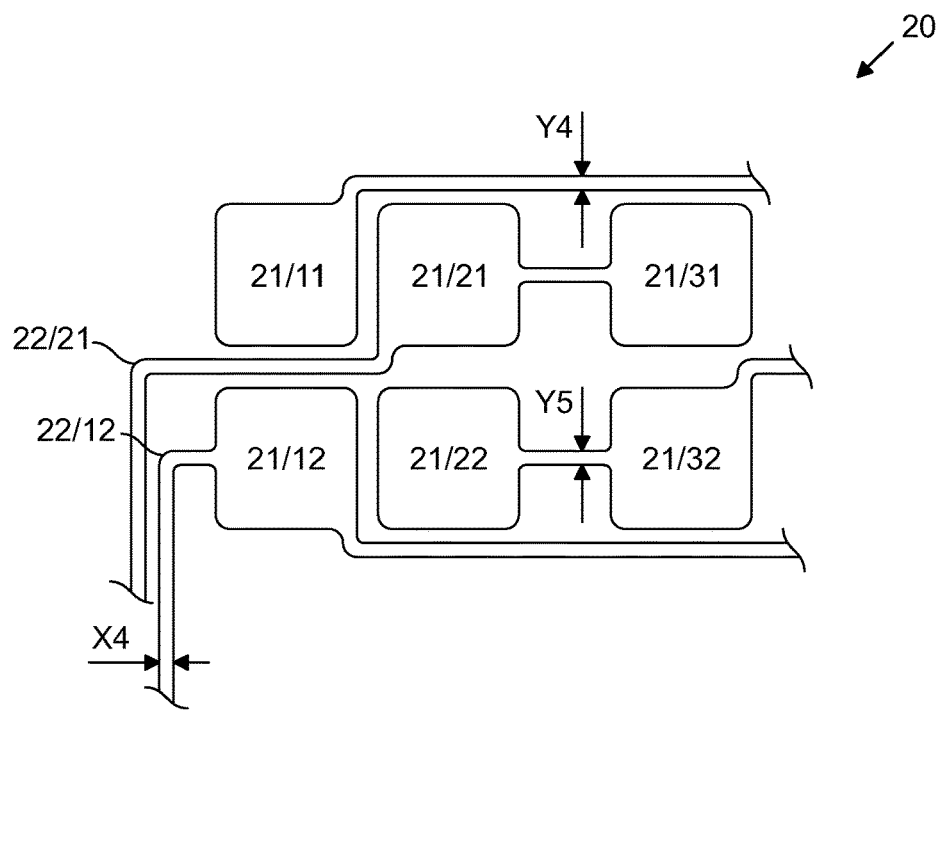

As visible in FIG. 2E, the at least four bladders in the group are spaced from one another by a distance X1, Y1, that is less than a distance X3, Y3 to an adjacent bladder not being part of the group. Depending on the implementation, this can be valid in the row direction and/or in the column direction.

In some embodiments, the value of X1 can be preferably comprised between 0 and 5 cm. Even more preferably, the value of X1 can be comprised between 0.5 and 2.5 cm. In some embodiments, the value of X3 can be preferably comprised between 0 and 10 cm". Even more preferably, the value of X3 can be comprised between 1 and 4 cm. In some embodiments, the value of Y1 can be preferably comprised between 0 and 5 cm. Even more preferably, the value of Y1 can be comprised between 0.5 and 2.5 cm. In further preferred implementations, the value of Y1 can be similar to X1. In some embodiments, the value of Y3 can be preferably comprised between 0 and 10 cm. Even more preferably, the value of Y3 can be comprised between 1 and 4 cm. In further preferred implementations, the value of Y3 can be similar to X3. In preferred embodiments, the bladders can have a size X2 in the row direction preferably comprised between 2 and 14 cm. Even more preferably, the value of X2 can be comprised between 4 and 10 cm. In preferred embodiments, the bladders can have a size Y2 in the column direction preferably comprised between 2 and 14 cm. Even more preferably, the value of Y2 can be comprised between 3 and 8 cm. In some embodiments, at least one bladder, preferably a majority of the plurality of bladders can have an area comprised between 4 and 200 $cm^2$. Even more preferably, the area can be comprised between 16 and 100 $cm^2$. Thanks to at least some of those dimensions, the pneumatic bladder arrangement can provide an effective support and/or massage for the back and/or legs of the user.

The dimensions and configurations provided above are in particular well adapted to a back configuration, particularly with the use of at least three groups of bladders per section, to a configuration for the upper legs, particularly with the use of at least two groups of bladders per section, and/or to a configuration for the lower legs, particularly with the use of at least one group of bladders per section. In some embodiments, it will be clear that those various configurations can be implemented separately from each other and inserted in the respective seat portions. Alternatively, or in addition, in some preferred embodiments one or more of those configurations can be implemented together, so as to simplify the manufacturing and installation process. In those cases it will be clear that the distances between bladders belonging to the black, upper legs, lower legs section can be higher than the values indicated for Y3.

FIG. 2B schematically illustrates a top view of the pneumatic bladder arrangement 20 further comprising a plurality of fluid supply connections 22/21-22/36 and fluid supply interconnections 27/1-27/12.

Each of the fluid supply connections 22/21-22/36 allows inflating and/or deflating of one or more bladder by a fluid source, as will be described more in details in the following. In particular, one or more, preferably all, of the fluid supply connections 22/21-22/36 connects to a first bladder directly, allowing direct inflating and/or deflating of the first bladder. Additionally, one or more, preferably all, of the fluid supply connections 22/21-22/36 allows indirect inflating and/or deflating of a second bladder, connected to the first bladder through an interconnection 27/1-27/12. For instance, fluid supply connection 22/21 connects directly to bladder 21/21. Bladder 21/21 is connected to bladder 21/31 through interconnection 27/2. In this manner, a single fluid supply connection 22/21 allows inflating and/or deflating of two bladders 21/21 and 21/31. It will be clear that this concept can be extended to a single fluid supply connection inflating and/or deflating any number of bladders through an appropriate number of fluid interconnections.

FIGS. 2C and 2D schematically illustrate how bladders of the pneumatic bladder arrangement 20 can be connected to the plurality of fluid supply connections 22/21-22/36 and/or to each other.

In preferred embodiments, at least one bladder 21/11-21/26 of the first array section S1 is connected to at least one bladder 21/31-21/46 of the second array section S2 by a fluid interconnection 27/1-27/12. That is, in preferred embodiments, one or more, preferably all, fluid interconnection 27/1-27/12 connects two bladders of two different sections S1-S2.

Alternatively, or in addition, in some embodiments, one or more, preferably all, fluid interconnection 27/1-27/12 can connect two bladders of two different groups G1/1-G2/3, such as, for instance, interconnection 27/1 connecting bladder 21/11 of group G1/1 and bladder 21/41 of group G2/1. Alternatively, or in addition, in some embodiments, one or more, preferably all, fluid interconnection 27/1-27/12 can connect two bladders of two groups G1/1-G2/3 in the same row direction, such as, for instance, interconnection 27/1 connecting bladder 21/11 of group G1/1 and bladder 21/41 of group G2/1. Alternatively, or in addition, in some embodiments, one or more, preferably all, fluid interconnection 27/1-27/12 can connect two bladders along the same row, such as, for instance, interconnection 27/1 connecting bladder 21/11 and bladder 21/41 of row R1.

Alternatively, or in addition, in some embodiments, a first fluid interconnection and a second fluid interconnection can connect two pairs of bladders of two adjacent rows. The first interconnection can connect bladders of two first columns and the second interconnection can connect bladders of two second columns. The two first columns are preferably different from the two second columns. This is the case, for instance, of first interconnection 27/1 connecting bladder 21/11 and bladder 21/41, in row R1, respectively in columns C1 and C4 and second interconnection 27/3 connecting bladder 21/22 and bladder 21/32, in row R2, respectively in columns C2 and C3.

Alternatively, or in addition, in some embodiments, a first fluid interconnection and a second fluid interconnection can connect two pairs of bladders of two adjacent rows. The first interconnection can connect bladders of two first columns and the second interconnection can connect bladders of two second columns. The two first columns are preferably the same of the two second columns. This is the case, for instance, of first interconnection 27/1 connecting bladder 21/11 and bladder 21/41, in row R1, respectively in columns C1 and C4 and second interconnection 27/4 connecting bladder 21/12 and bladder 21/42, in row R2, also respectively in columns C1 and C4.

Alternatively, or in addition, in some embodiments, a first fluid interconnection and a second fluid interconnection can connect two pairs of bladders of a single row. The first interconnection can connect bladders of two first columns and the second interconnection can connect bladders of two second columns. The two first columns are preferably different from the two second columns. This is the case, for instance, of first interconnection 27/1 connecting bladder 21/11 and bladder 21/41, in row R1, respectively in columns C1 and C4 and second interconnection 27/2 connecting bladder 21/21 and bladder 21/31, also in row R1, respectively in columns C2 and C3.

In some embodiments, those configurations can be implemented preferably for some fluid interconnections of at least two adjacent rows, preferably at least four adjacent rows, even more preferably of at least six adjacent rows. Alternatively, or in addition, in some embodiments those configurations can be implemented preferably at least two times, more preferably at least three times, even more preferably at least four times in the pneumatic bladder arrangement.

In general, as it is visible from FIGS. 2C and 2D, the fluid interconnections allow interconnection of the bladders so that a single fluid supply connection can control inflation and/or deflation of at least two bladders placed symmetrically with respect to a longitudinal axis separating the first and second sections S1, S2. This advantageously allows a single fluid supply connection to provide inflation and/or deflation to more than one bladder, thus reducing complexity and costs, without any perceived disadvantage from the user. In fact this interconnections results in a symmetrical operation of the at least two bladders which are generally placed at symmetrical positions on the back of the user, with respect to the spinal column as symmetry axis. Since most users prefer such a symmetrical control, the lack of independent control of the at least two bladders with respect to each other is not only not a disadvantage but it ensures that the requested symmetrical control can be easily achieved.

Moreover, as it is visible from FIGS. 2C and 2D, the fluid interconnections allow interconnection of the bladders so that, for a given row, at least two bladders on more internal columns, such as C2 and C3, and at least two bladders on more external columns, such as C1 and C4, can be controlled independently. As will be evident from the following description, this advantageously allows a number of massage patterns to be implemented with a reduced number of fluid supply connections.

Figure 2G:
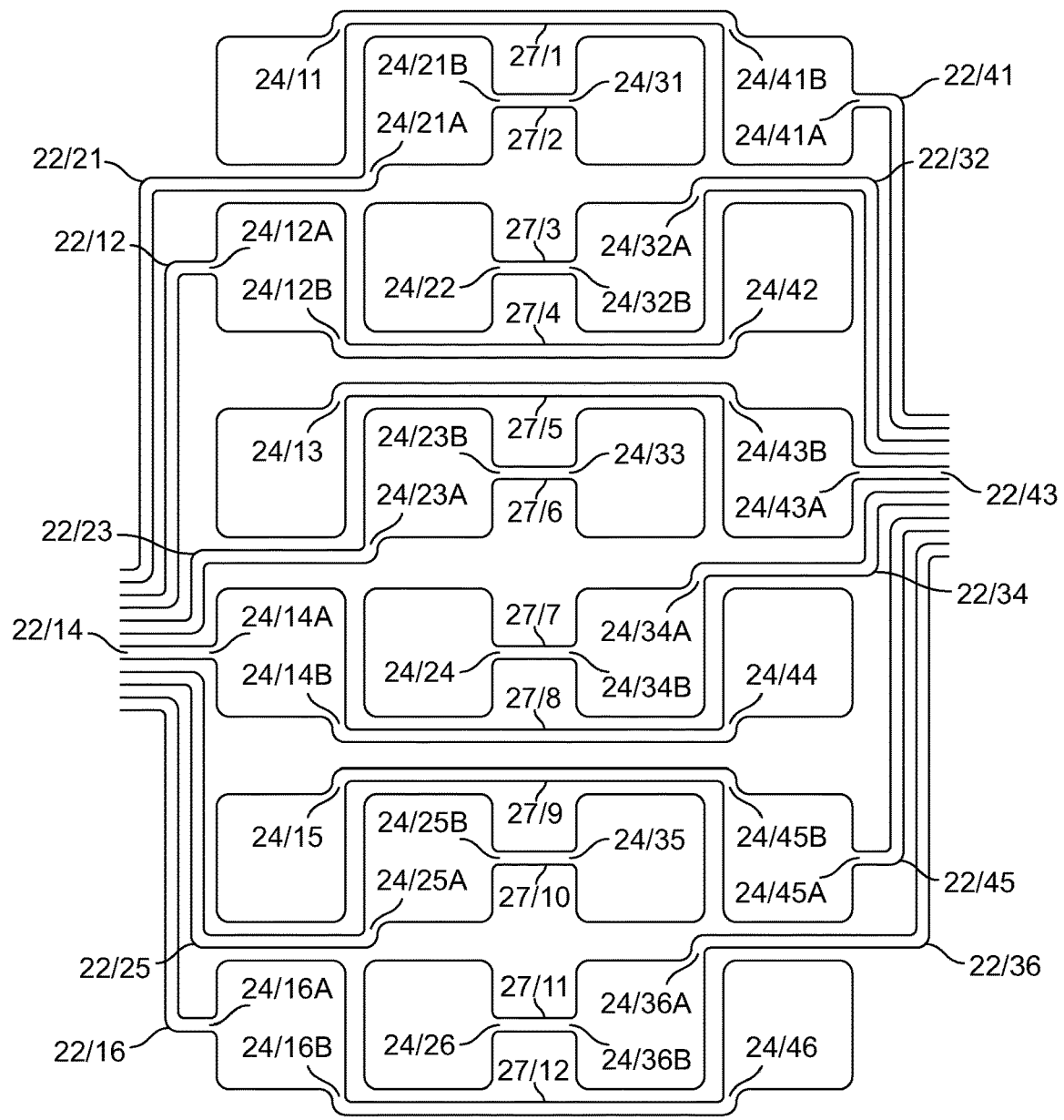
FIG. 2G schematically illustrates a possible positioning of fluid ports of the bladders of the pneumatic bladder arrangement 20.

As visible in FIG. 2G, in some embodiments, in order to achieve the advantageous interconnections described above, one or more of the bladders are provided with one fluid port only, for instance bladder 22/11 with fluid port 24/11, and one or more of the bladders are provided with two fluid ports, for instance bladder 22/21 with fluid ports 24/21A and 24/21B. Preferably, the number of bladders with one fluid port only and with two fluid ports is the same in the pneumatic bladder arrangement. Alternatively, or in addition, the number of bladders with one fluid port only and with two fluid ports can be the same in sections S1 and S2. Still alternatively, or in addition, the number of bladders with one fluid port only and with two fluid ports can be the same in one or more, preferably all, groups G11-G23.

In particular, in addition to a first port as previous described, in some embodiments it is preferred that at least one of the bladders of the first array section S1 has a second fluid port 24/21B, 24/12B, 24/23B, 24/14B, 24/25B, 24/16B in connection with a first fluid port 24/31, 24/41A, 24/32A, 24/42, 24/33, 24/43A, 35/34A, 24/44, 24/35, 24/45A, 24/36A, 24/46 of one of the bladder of the second array section S2. Alternatively, or in addition, in addition to a first port as previous described in some embodiments it is preferred that at least one of the bladders of the second array section S2 has a second fluid port 24/41B, 24/32B, 24/43B, 24/34B, 24/45B, 24/36B in connection with a first fluid port 24/21A, 24/12A, 24/22, 24/13, 24/23A, 35/14A, 24/24, 24/15, 24/25A, 24/16A, 24/26 of one of the bladder of the first array section S1.

In some embodiments, one/or more, preferably all, of the fluid interconnections 27/1-27/12 is formed between two flexible sheets of material 13/1-13/2 in a manner similar to what has been previously described for the fluid supply connections and for the bladders. Preferably, the same two flexible sheets of material 13/1-13/2 are used for one or more, preferably all, of the fluid interconnections 27/1-27/12 of the fluid supply connections and of the bladders.

In some embodiments, one or more, preferably all, of the fluid interconnections extend through the bladders 21/11-21/46 mainly in a row direction. Here mainly is understood to mean for at least 70% of their length, preferably at least 80% of their length, even more preferably at least 90% of their length. Thanks to this routing, it is possible to make better use of the more space available in the Y direction than in the X direction, due to the shape of the back of an average user.

In the description above, details have been provided with respect to the placement and realization of elements related to the inflation and/or deflation of the pneumatic bladder arrangement, such as bladders, fluid supply connections and fluid interconnections. In some implementation of the invention, those elements can also provide sufficient structural integrity to the pneumatic bladder arrangement for its use in a seat.

That is, a pneumatic bladder arrangement comprising only bladders and fluid supply connections, and where applicable fluid interconnections, can have sufficient structural integrity for being mounted and operated in a seat. In some cases, this can be achieved, for instance, by using a flexible material guaranteeing sufficient rigidity for the required structural integrity while allowing enough flexibility for the bladders to inflate and deflate.

This configuration has the advantage that free space is left in between the various elements of the pneumatic bladder arrangement. This space can be advantageously used for the correct ventilation and/or heating of the seat surface. In particular, in some embodiments, considering a plane on which the pneumatic bladder arrangement lies, it is preferred that at least 10%, preferably at least 20% and even more preferably at least 40% of the plane is free from the bladders and fluid supply connections, and where applicable fluid interconnections. This value is an ideal compromise between a size of the bladders sufficient for an effective operation and an effective ventilation and/or heating of the seat.

The bladder arrangement may thus be configured such that it allows minimizing the impact of the foil surface on the good ventilation properties of the foam of the corresponding seat. Pipes or tubes used for the supply of fluid may be arranged behind the bladder arrangement, and/or the foil or flexible sheet of material used for the bladder arrangement may not be positioned on the foam, but may be inserted in the foam, e.g., in a cut-out or groove formed in the foam.

Alternatively, in some embodiments, portions of at least one of flexible sheets 13/1-13/2 can be used for implementing additional structural elements. Alternatively, or in addition, the structural elements can comprise one or more connection elements for connecting bladders and fluid supply connections, and/or where applicable fluid interconnections.

In general, in some embodiments, the bladders of the first array section S1 can be formed between two flexible sheets 13/1-13/2 of material, as previously described, which can also be used for connecting the bladders of the first array section S1. Similarly, the bladders of the second array section S2 can be formed between two flexible sheets 13/1-13/2 of material, also usable for connecting the bladders of the second array section S2.

Figure 2H:
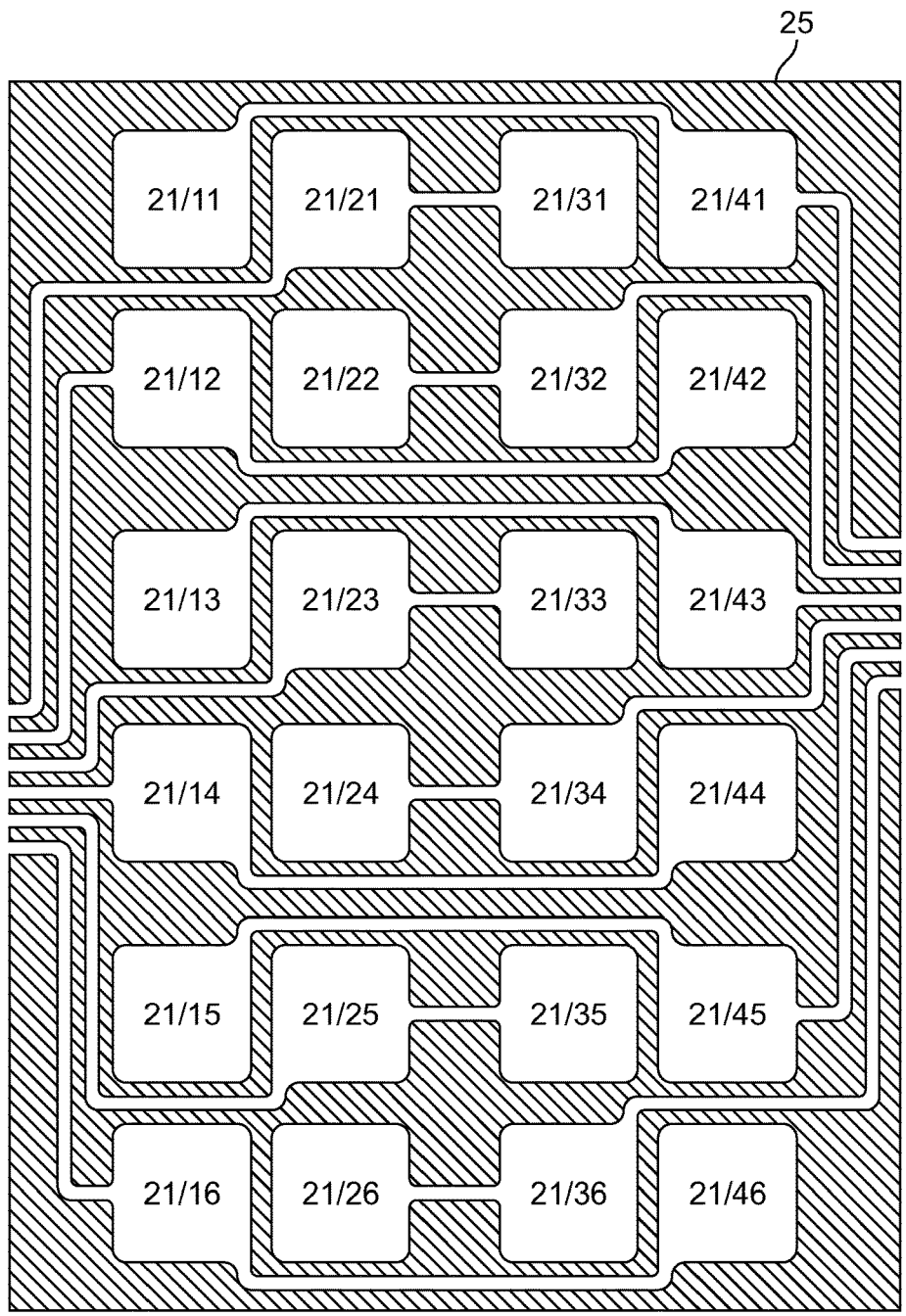
FIGS. 2H, 2I and 2J schematically illustrates possible of connection elements between the bladders of the pneumatic bladder arrangement 20.

FIG. 2H illustrates one exemplary case in which all parts of the flexible sheet 13/1 and/or of the flexible sheet 13/2 which have not been used for the implementation of bladders 21/11-21/67, fluid supply connections 22/21-22/36 and fluid interconnections 27/1-27/12 are maintained for providing a connection element 25 among those elements. In case connection element is implemented by both flexible sheet 13/1 and/or of the flexible sheet 13/2, those two sheets might be bound together or not.

The implementation of FIG. 2H ensures an improved structural integrity of the pneumatic bladder arrangement without incurring in additional costs, as the material of flexible sheet 13/1 and/or of the flexible sheet 13/2 not used for the fluid parts would generally be discarded. In applications in which the ventilation and/or heating of the seat does not have to go through the pneumatic bladder arrangement, the implementation of FIG. 2H is therefore particularly advantageous.

Figure 2I:
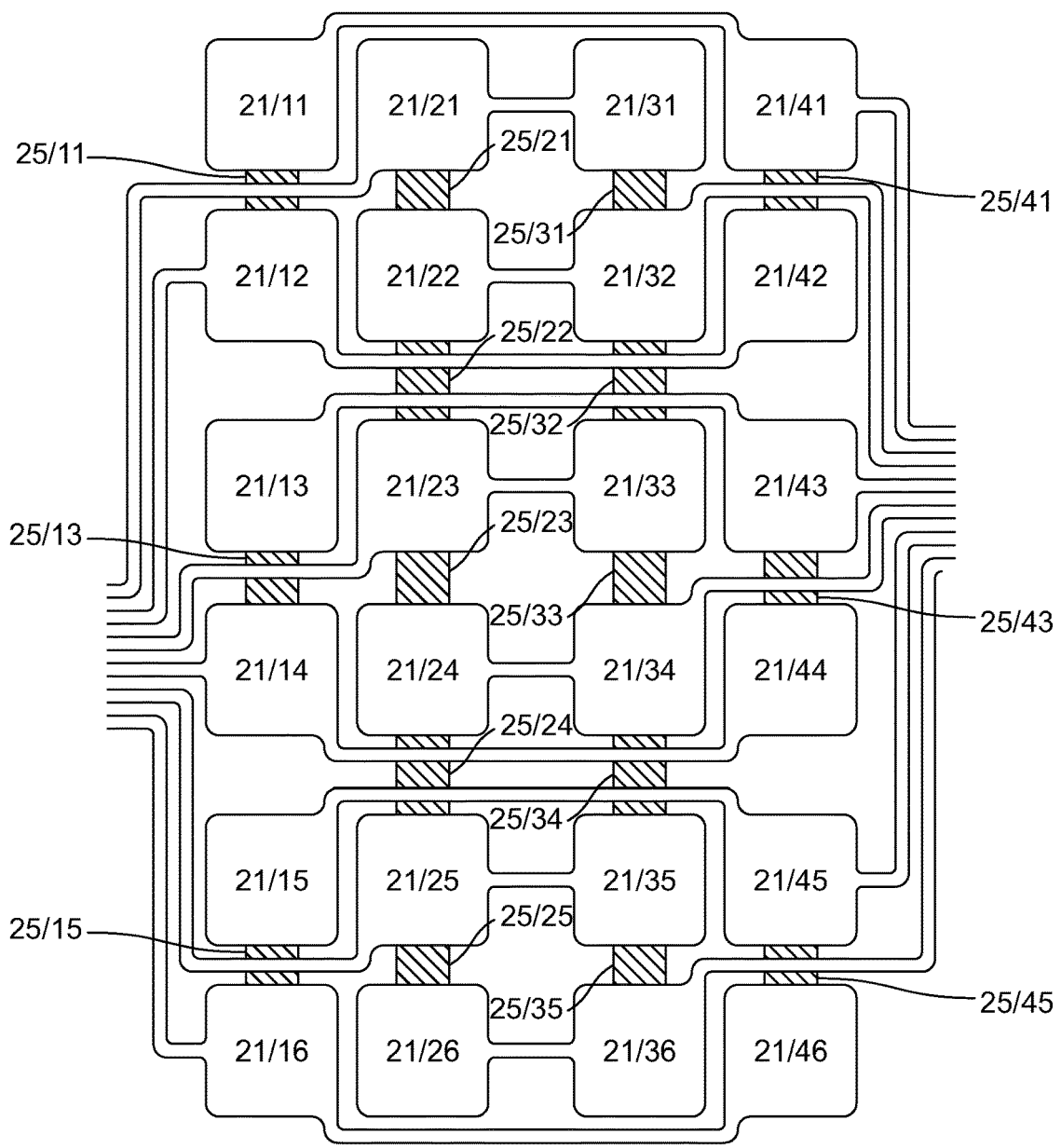

FIG. 2I schematically illustrates a further alternative embodiment comprising a plurality of connection elements 25/11, 25/45, implemented from portions of the flexible sheet 13/1 and/or of the flexible sheet 13/2. In some embodiments, considering a plane on which the pneumatic bladder arrangement lies, the combined size of connection elements 25/11, 25/45 is comprised between 5% and 10% of the plane. This value allows the plurality of connection elements 25/11, 25/45 to contribute to reaching an effective integrity of the pneumatic bladder arrangement without substantially hindering ventilation and/or heating from passing through the plane of the pneumatic bladder arrangement.

In some embodiments, the number of connection elements in a group can be higher than the number of connection elements in between groups. As will become clearer from the following description, some massage patterns are such that bladders of a group can be operated in a rotation manner. By providing more connection elements inside a group it is ensured that the relative placement of the bladders in the group is better maintained, resulting in a more regular rotation. This is illustrated in FIG. 2I, for instance by providing two connection elements 25/11 and 25/21 between bladders 21/11-21/22 of group G1/1 while only one connection element is present between group G1/1 and G1/2.

Alternatively, or in addition, in some embodiments, the connection elements can mainly connect bladders in the column direction. Here mainly is to be understood that the number of connection elements in the column direction is at least 70%, preferably at least 80%, even more preferably at least 90% of the total number of connection elements 25/11-25/45. This configuration is particularly advantageous for the assembling of the pneumatic bladder arrangement, as it avoids that the pneumatic bladder arrangement stretches in an undesired manner during assembly. Moreover, in case where the fluid interconnections 24/1-24/12 extend mainly in the row direction, such as illustrated in FIG. 2I, stability in the row direction can be obtained by the fluid interconnections 24/1-24/12 while the connection elements 25/11-25/45 ensure stability in the column direction.

Figure 2J:
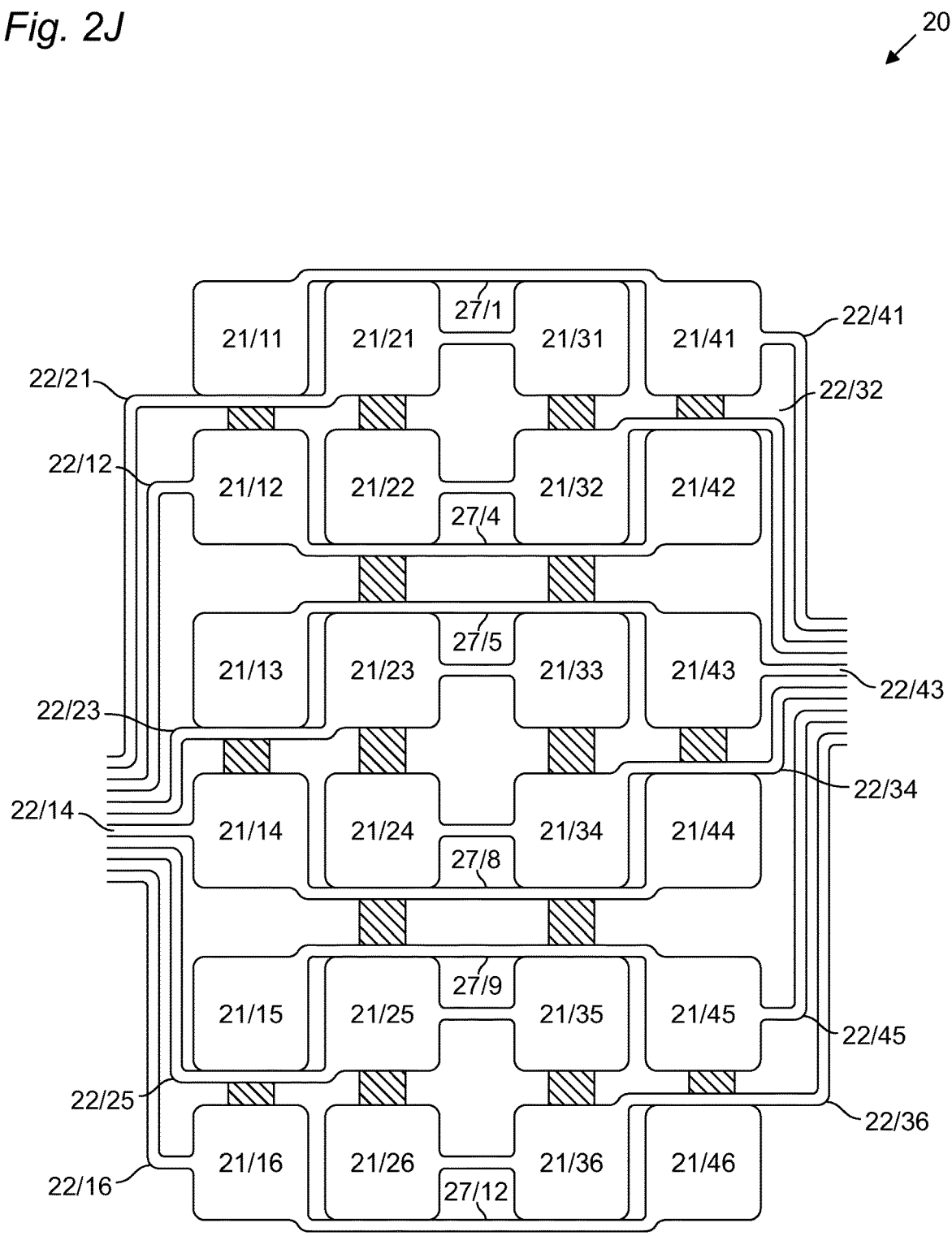

In the implementations illustrated in FIGS. 1D and 2B, the fluid interconnections and/or the fluid supply connections are illustrated as being separated from the bladders along their path. The present invention is not limited thereto and, in some embodiments, the fluid interconnections and/or the fluid supply connections might be, for at least part of their length, bound to one or more bladders. For instance, as visible in FIG. 2J, part of the fluid supply connection 22/21 can be bound to bladder 22/11. Similarly, part of fluid interconnection 27/1 can be bound to bladders 21/21 and 21/31. This provides the advantage that the manufacturing is simplified since a single welding operation results in the shared welded portion of the bladder and of the part of the fluid interconnection and/or the fluid supply connection bound thereto. Moreover, the mechanical connection between the bladders and the fluid interconnections and/or the fluid supply connections increases the integrity of the pneumatic bladder arrangement.

In some embodiments, given a single row, at least one fluid interconnection can be bound to the side of at least two bladders. This is the case, for instance, of fluid interconnection 27/1 can be bound to bladders 21/21 and 21/31. Preferably, this configuration is present for any couple of groups adjacent in the row direction, even more preferably for all couples of groups adjacent in the row direction. In some implementations, such configuration can be present twice for any couple of groups adjacent in the row direction, even more preferably for all couples of groups adjacent in the row direction. This is illustrated for instance the case in FIG. 2J, where, for groups G1/1 and G2/1, fluid interconnections 27/1 and 27/4 are implemented in this manner.

Preferably, for at least one couple of groups adjacent in the row direction, even more preferably for all couples of groups adjacent in the row direction, the fluid interconnections bound to the bladders are external, in the column direction, to the bladders. This is illustrated for instance the case in FIG. 2J, where, for groups G1/1 and G2/1, fluid interconnections 27/1 and 27/4 are external to the bladders 21/21, 21/22, 21/31, and 21/32 in the column direction. This allows those external fluid interconnections to strengthen the four bladders together, thus improving the integrity of the pneumatic bladder arrangement.

Although in the figures the fluid supply connections are illustrated as being separated from each other, the invention is not limited thereto and, in some embodiments, the fluid supply connections might be bound together, particularly at their portions parallel to adjacent fluid supply connections. This increases the integrity of the fluid supply connections. This can be particularly advantageous in the terminal part of the fluid supply connections, away from the bladders, as it allow the fluid supply connections to be bound together. Such implementation can simplify their routing and allow a single connection of the bundle of fluid supply connections to other elements, thus simplifying assembly of the seat.

Figure 3A:
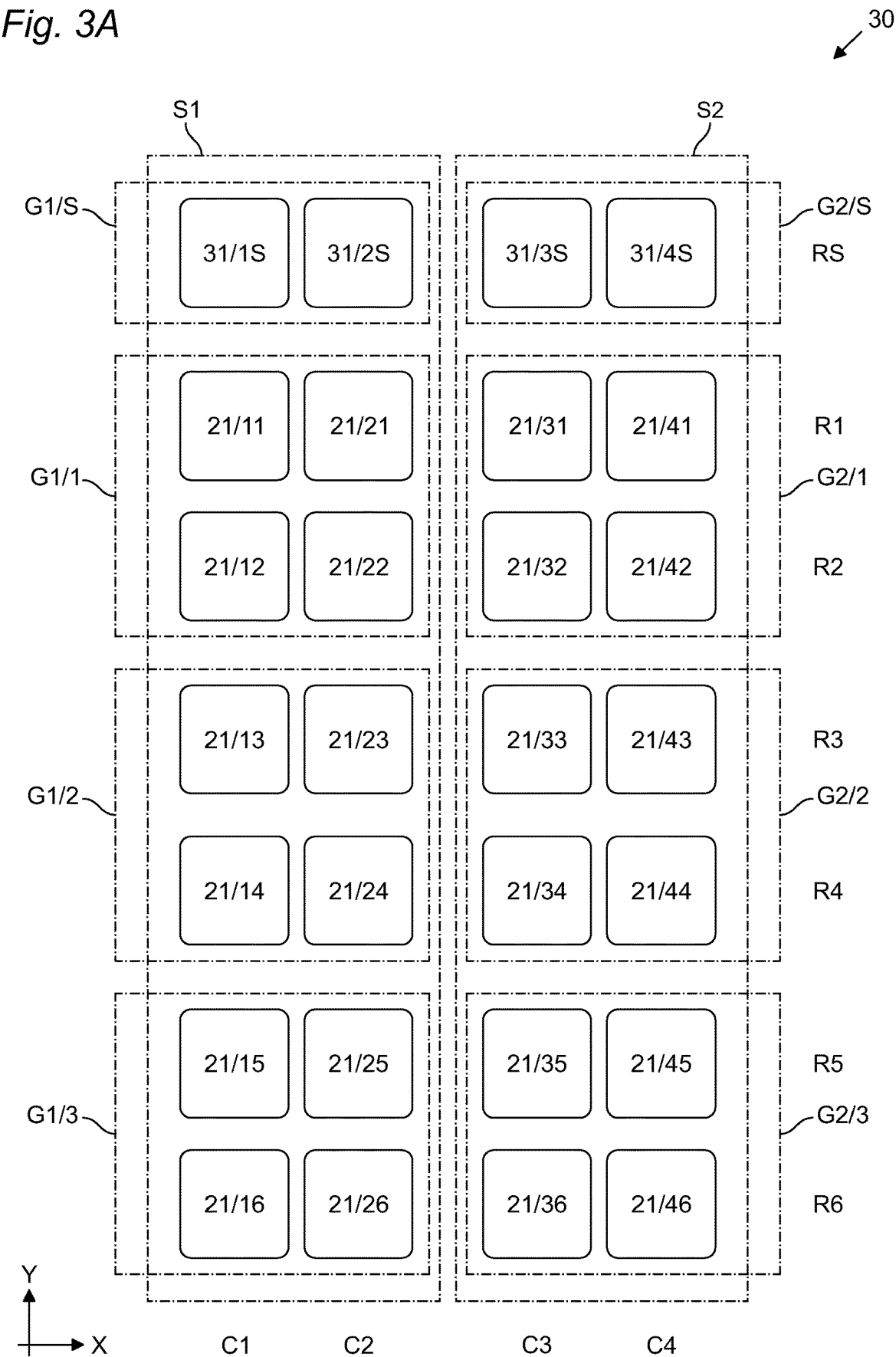
FIG. 3A schematically illustrates a top view of a plurality of bladders of a pneumatic bladder arrangement 30.
Figure 3B:
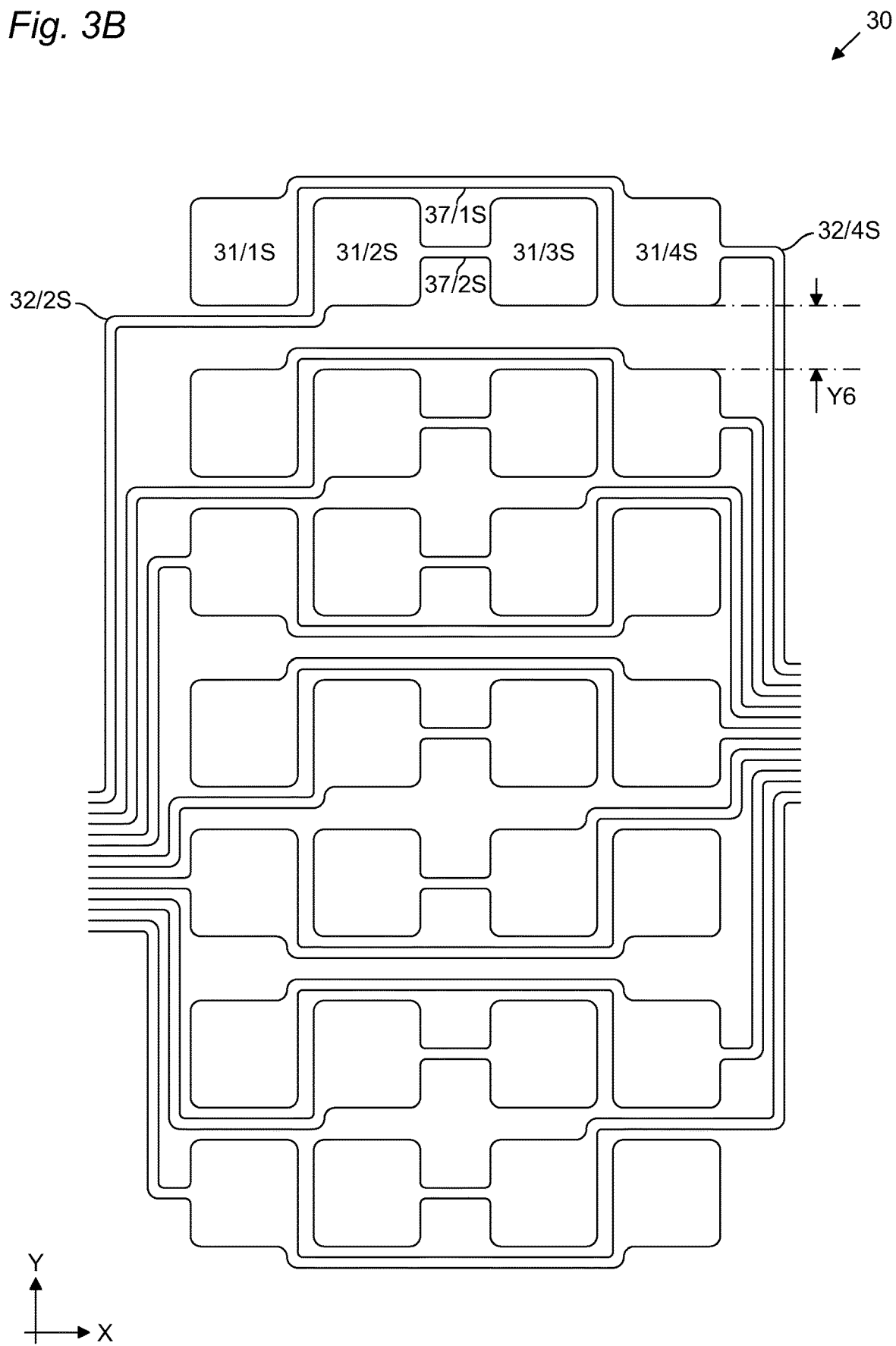
FIG. 3B schematically illustrates a top view of the pneumatic bladder arrangement 30 further comprising a plurality of fluid supply connections.

FIG. 3A schematically illustrates a top view of a plurality of bladders of a pneumatic bladder arrangement 30 according to a further embodiment. FIG. 3B schematically illustrates a top view of the pneumatic bladder arrangement 30 further comprising a plurality of fluid supply connections and interconnections. Unless otherwise specified the features and advantages of the pneumatic bladder arrangement 10 and 20 can also be applied to the pneumatic bladder arrangement 30.

The pneumatic bladder arrangement 30 differs from pneumatic bladder arrangement 20 in that the first array section S1 and the second array section S2 each comprise at least one additional group G1/S-G2/S of two bladders 31/1S-31/4S arranged in one row of the array. As previously described, while the illustrated embodiment shows the bladders, including those of additional group G1/S-G2/S, to be aligned along straight columns and straight lines, the present invention is not limited thereto. Alternatively, or in addition, the bladders can be placed in a non-regular and/or non-repeating pattern. As previously described, in some embodiments the position of the bladders with respect to a straight row and/or a straight column can vary up to 50%, preferably up to 25% with respect to the size of the bladder along the row or along the column, respectively.

The additional bladders of groups G1/S-G2/S might be used, for instance, for the shoulder, neck, or head region of a person sitting on the corresponding seat. To this effect, groups G1/S-G2/S might be advantageously positioned at a distance Y6 from the groups G1/1, G2-1 previously described, which is larger than the inter-group distance Y3 previously discussed with reference to FIG. 2E. In particular, Y6 can be comprised between 1 and 15 cm. Even more preferably, the value of Y6 can be comprised between 2 and 8 cm.

In the illustrated embodiment, groups G1/S, G2/S comprise only two bladders each. It will be understood that this is an example only. Groups G1/S-G2/S as illustrated generally correspond to the top half of groups G1/1, G2/1 and will not be described more in details, the same features and advantages already discussed previously applying also to groups G1/S, G2/S. In alternative embodiments, groups G1/S, G2/S might comprise four or more bladders each, as described for groups G1/1, G2/1.

Similar configurations can be provided, for instance, for the upper legs section and a footrest, where the groups G1/1-G2/3 are configured to be placed on a seat cushion under the upper legs and the groups G1/S-G2/S can be placed in the footrest.

In a similar manner, although not illustrated, alternative bladder arrangements may also comprise bladders to be arranged on the A-surface of the corresponding seat. The arrangement of the bladders could equally be applied to a support structure, such as a seat suspension or similar, which can be positioned on the B-surface of the foam. In general the bladders can be positioned anywhere in the seat construction, preferably with the exclusion of the visible, outside, surface of the seat.

In the above description of the pneumatic bladder arrangements 20 and 30, the use of fluid interconnections has been described, so as to lower the number of fluid supply connections. It will be clear, however, that the invention is not limited thereto. In some applications, one or more of the bladders, possibly all, which have been described as being controlled through a fluid interconnection might instead be provided with a separate fluid supply connection instead.

In the previous description, various configurations have been described in which the bladders are generally realized by bonding together two sheets of flexible material 13/1-13/2. The difference in thickness between the inflated and the deflated state is thus dependent on the pressure and on the geometrical characteristics of the bladders.

There might be applications in which a given value for the difference in thickness between the inflated and the deflated state is desired, which however cannot be obtained by a single bladder. The invention provides a manner for increasing such thickness difference at will, as will be described with reference to the pneumatic bladder arrangement 40 of FIGS. 4A-4L.

FIGS. 4A, 4C, 4E, 4G, 4I schematically illustrate a top view of a flexible sheet of a pneumatic bladder arrangement 40 while FIGS. 4B, 4D, 4F, 4H, 4J schematically illustrate a side view of the respective flexible sheet of FIGS. 4A, 4C, 4E, 4G, 4I. In FIGS. 4B, 4D, 4F, 4H, 4J, the sheets illustrated in the respective FIGS. 4A, 4C, 4E, 4G, 4I are indicated in thicker lines. FIG. 4K schematically illustrates a top view of a portion of a plurality of flexible sheets of the pneumatic bladder arrangement 40 and FIG. 4L schematically illustrates a section view of the pneumatic bladder arrangement 40 along line L-L' of FIG. 4K. Unless otherwise specified the features and advantages of any of the pneumatic bladder arrangements 10, 20 and 30 can also be applied to the pneumatic bladder arrangement 40.

Generally, the approach of pneumatic bladder arrangement 40 consists in vertically stacking at least two bladders by using more than two flexible sheets 43/1-43/6. In particular, the illustrated embodiment shows two additional overlapping bladders 41/1 and 41/2, vertically stacked on top of the previously described bladders. It will however be clear that any number of overlapping bladders can be implemented in addition to the previously described bladders.

Figure 4A:
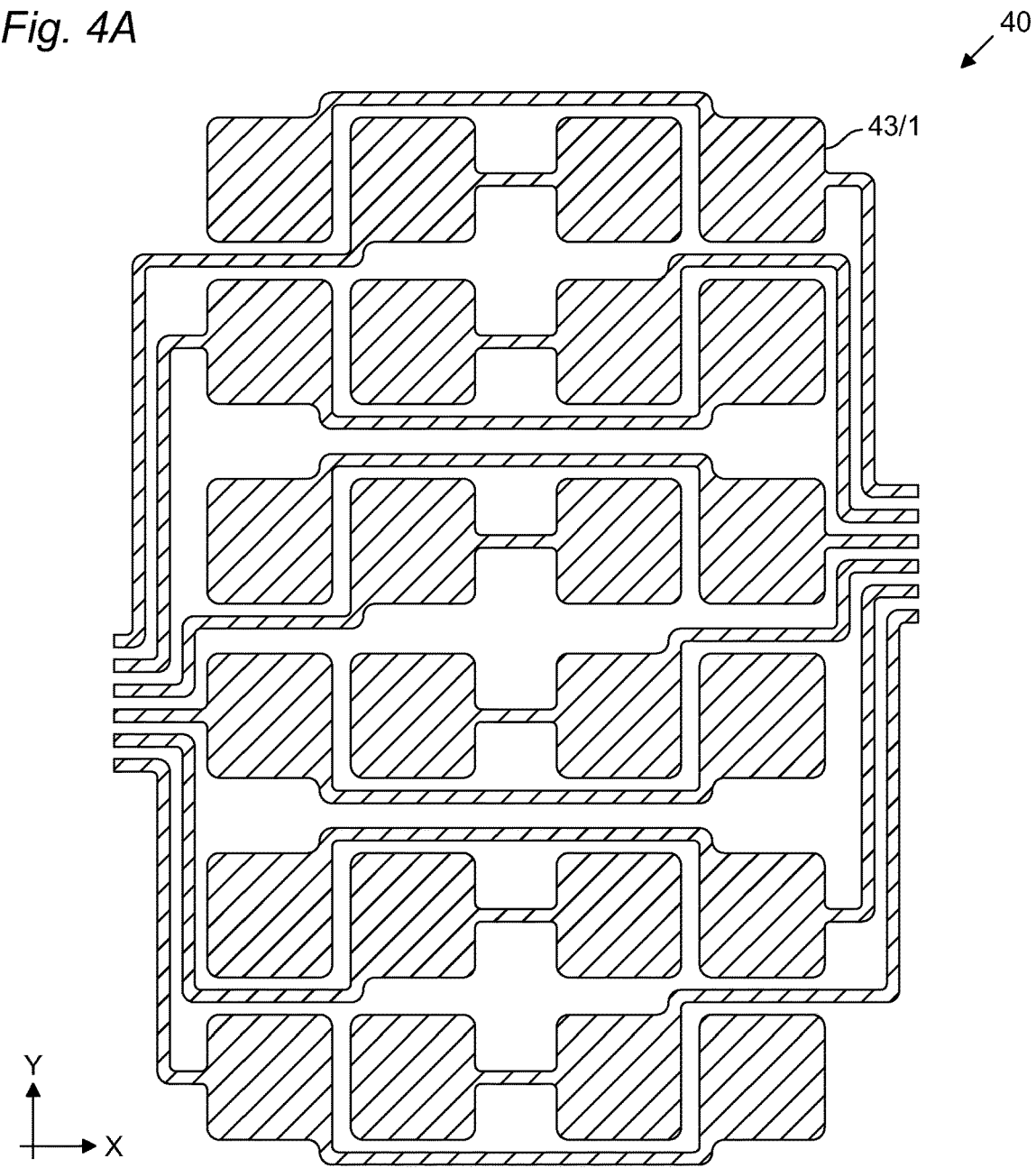
FIGS. 4A, 4C, 4E, 4G, 4I schematically illustrate a top view of a flexible sheet of a pneumatic bladder arrangement 40.
Figure 4B:
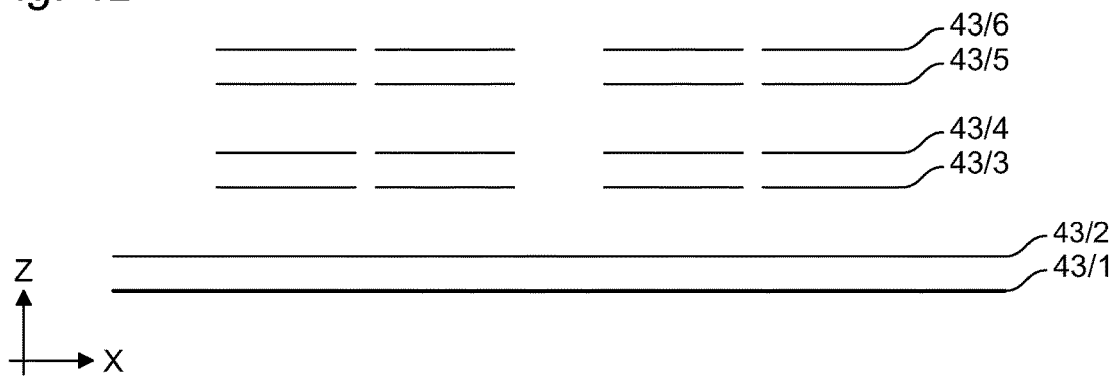
FIGS. 4B, 4D, 4F, 4H, 4J schematically illustrate a side view of the respective flexible sheet of FIGS. 4A, 4C, 4E, 4G, 4I.

FIG. 4A illustrates a first sheet 43/1 substantially similar to sheet 13/1 in the configuration illustrated in FIG. 2B so that no further detailed description will be needed. It will be understood that other possible implementations such as the connection elements of FIGS. 2H-2J can be implemented and have not been illustrated.

Figure 4C:
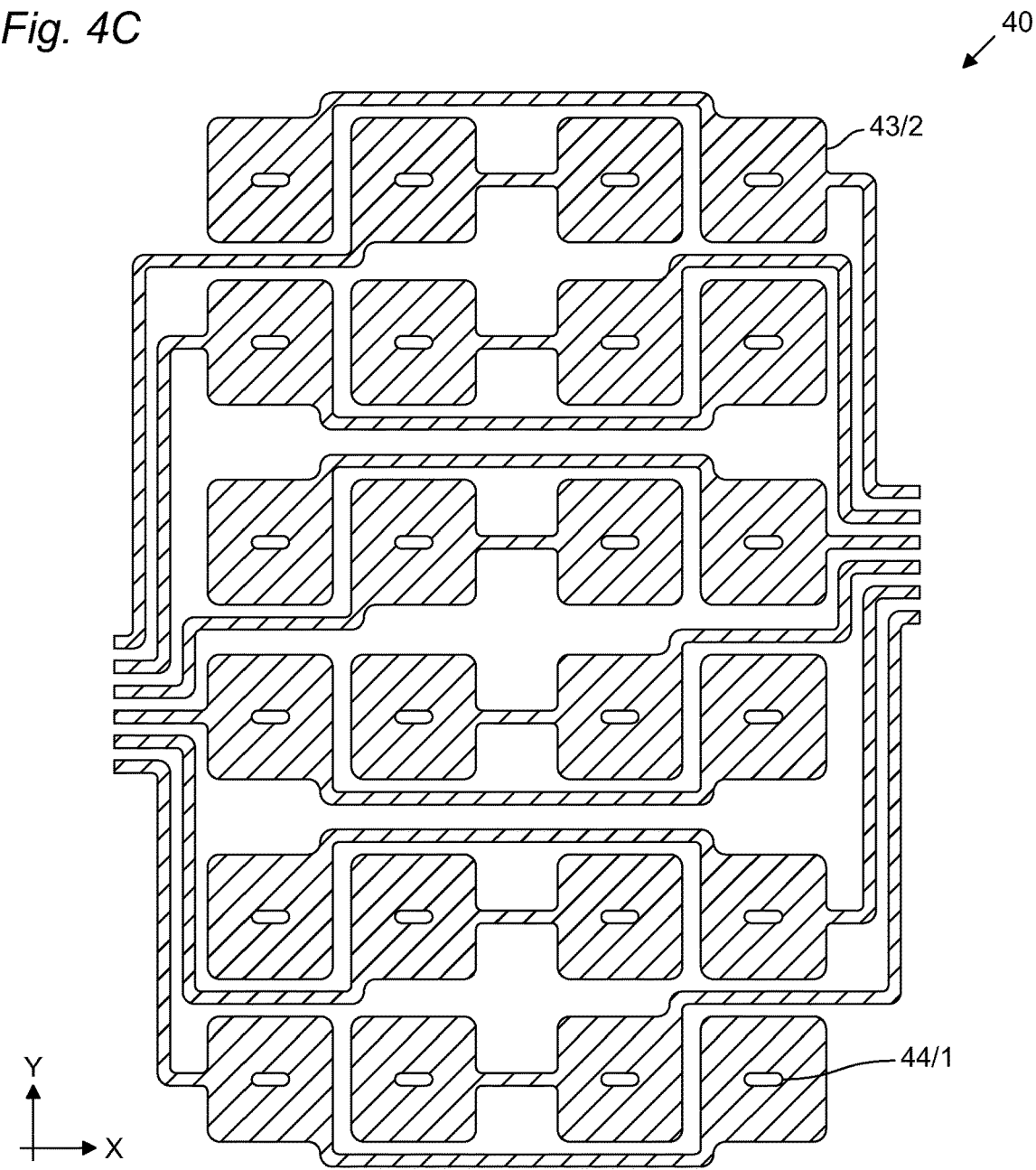
Figure 4D:
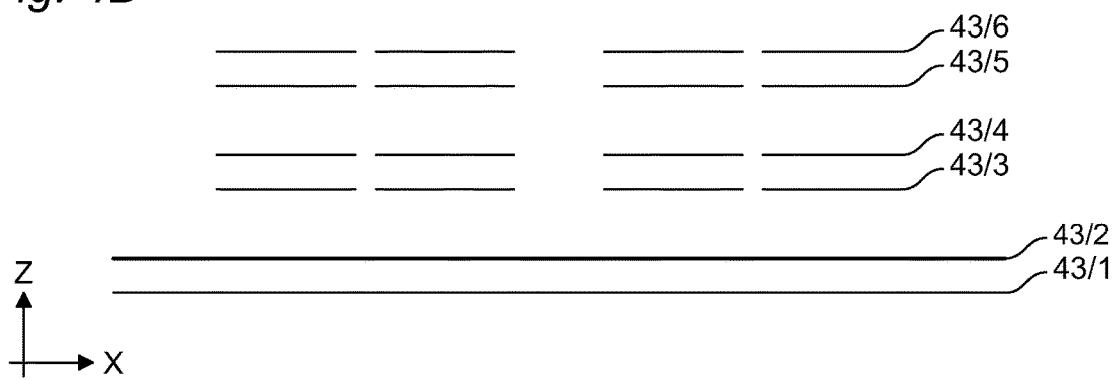

FIG. 4C illustrates a second sheet 43/2 substantially similar to sheet 13/2 except for the provision of a fluid port 44/1, configured to connect the bladders implemented by sheets 43/1-43/2 to first overlapping bladders 41/1.

In some embodiments, the fluid port 44/1 is preferably placed substantially in a central position of the bladders. This is advantageous as it maintains vertical alignment of the bladders of sheets 43/1-43/2 with the first overlapping bladders 41/1. The fluid port 44/1 can generally have any shape. In some embodiments it is preferred that the fluid port

44/1 has a shape which is symmetrical with respect to at most one axis of symmetry. As it will become clearer from the following description, this allows an overlapping port 44/2 to have a similar shape oriented in a different orientation, for avoiding sticking of the overlapping bladders during manufacturing and/or operation. In some embodiments the fluid port 44/1 preferably has an elongated shape. This advantageously increases the bonding area between sheet 43/2 and 43/3 while at the same time allowing the bladders to inflate to a satisfactory thickness. Preferably, the fluid port 44/1 has an area comprised between 0.5 and 5 cm$^2$, even more preferably, between 1 and 2.5 cm$^2$.

Figure 4E:
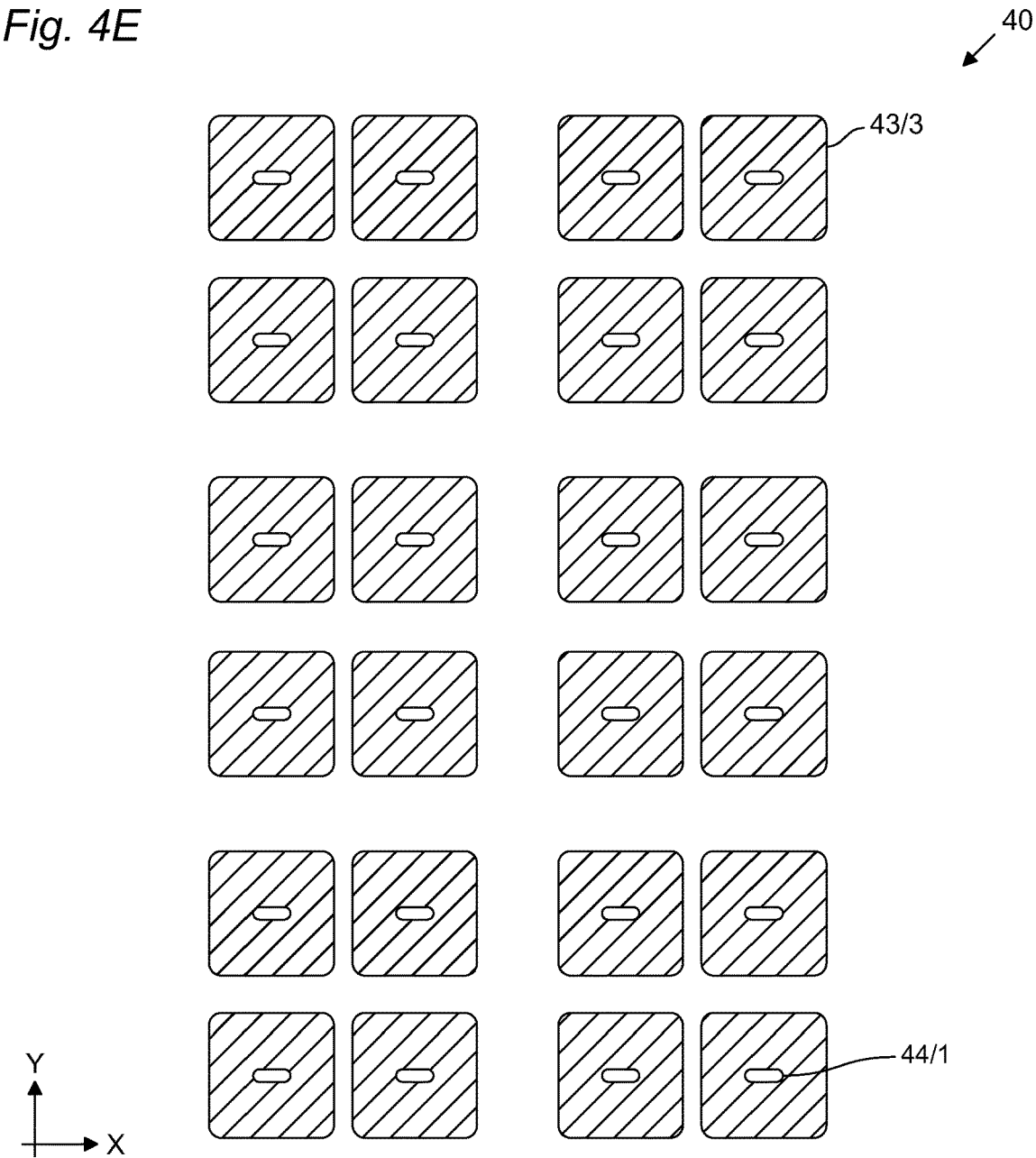
Figure 4F:
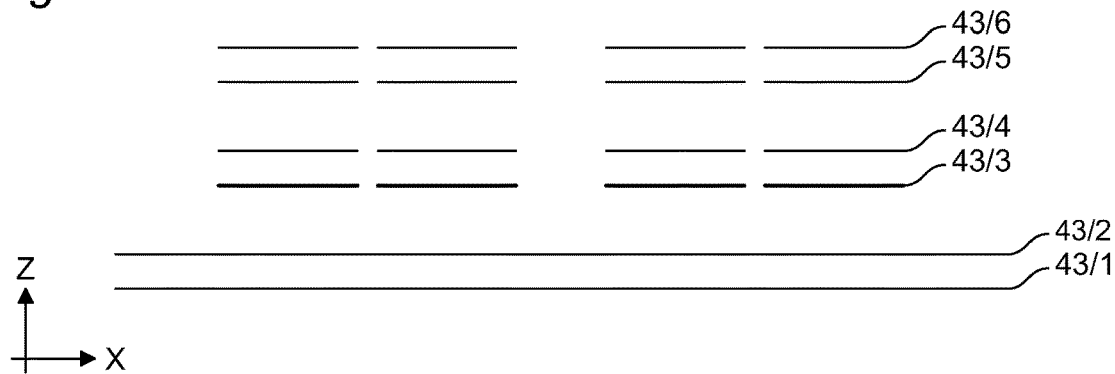

FIG. 4E illustrates a third sheet 43/3. In the illustrated embodiment, third sheet 43/3 only comprises regions for implementing the first overlapping bladders 41/1. The present invention is however not limited thereto and the third sheet 43/3 could also comprise regions for connecting the bladders, similarly to connection elements 25, 25/11-25/45 and/or regions for implementing fluid interconnections similar to fluid interconnections 27/1-27-12, and/or regions for implementing fluid supply connections similar to fluid supply connections 22/11-22-45. Moreover, in the illustrated embodiment the third sheet 43/3 is configured so as to implement a first overlapping bladder 41/1 for any of the bladders implemented by sheets 43/1-43/2. The invention is however not limited thereto and, for instance, the number of first overlapping bladder 41/1 might be smaller than the bladders implemented by sheets 43/1-43/2. Moreover, in the illustrated embodiment the third sheet 43/3 is configured so as to implement a plurality of first overlapping bladders 41/1 having a shape and size substantially similar to those of the bladders implemented by sheets 43/1-43/2. The invention is however not limited thereto and, for instance, the shape and size of first overlapping bladder 41/1 might differ from the respective lower bladder implemented by sheets 43/1-43/2. Those considerations will also be valid for any of the sheets above third sheet 43/3.

The third sheet 43/3 has a plurality of fluid ports 44/1 with size and positions corresponding to the fluid ports 44/1 of the second sheet 43/2, so as to provide a fluid connection between the bladder implemented by sheets 43/1-43/2 and the first overlapping bladder 41/1.

Figure 4G:
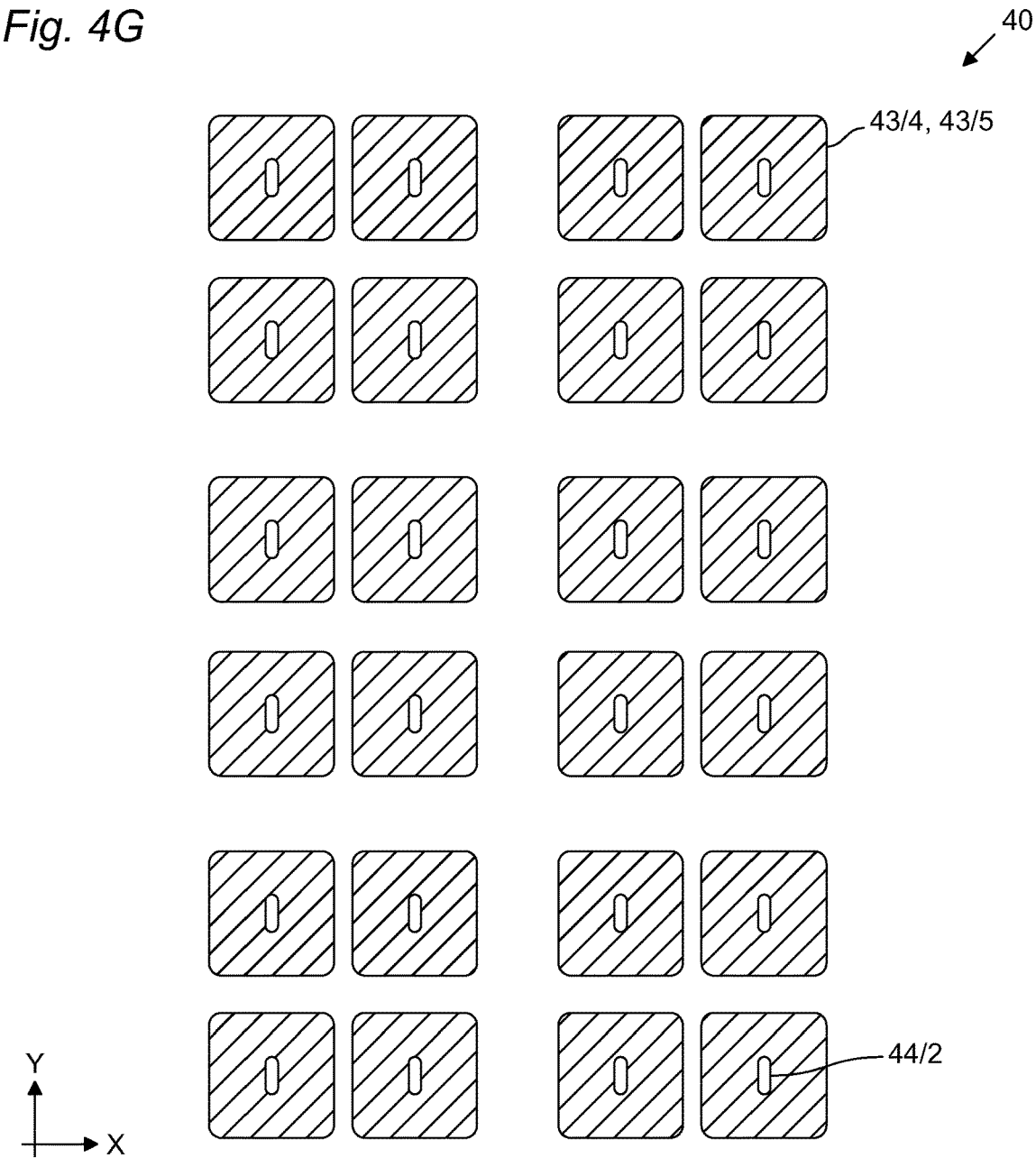
Figure 4H:
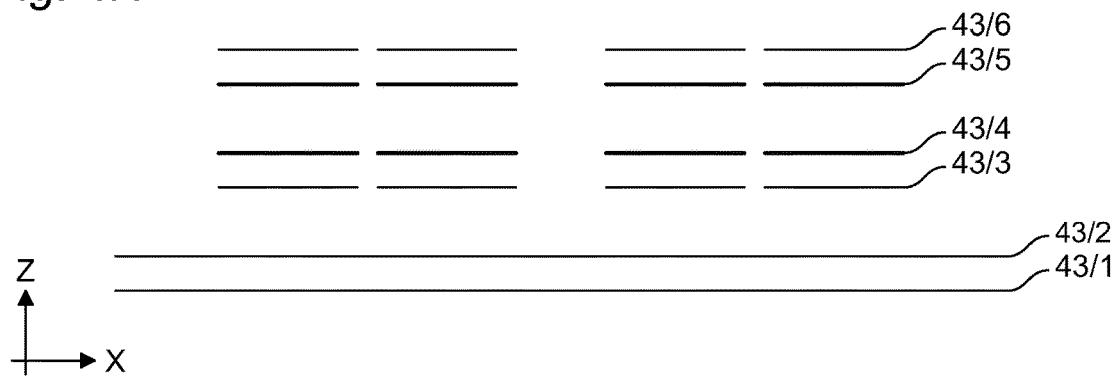
Figure 4I:
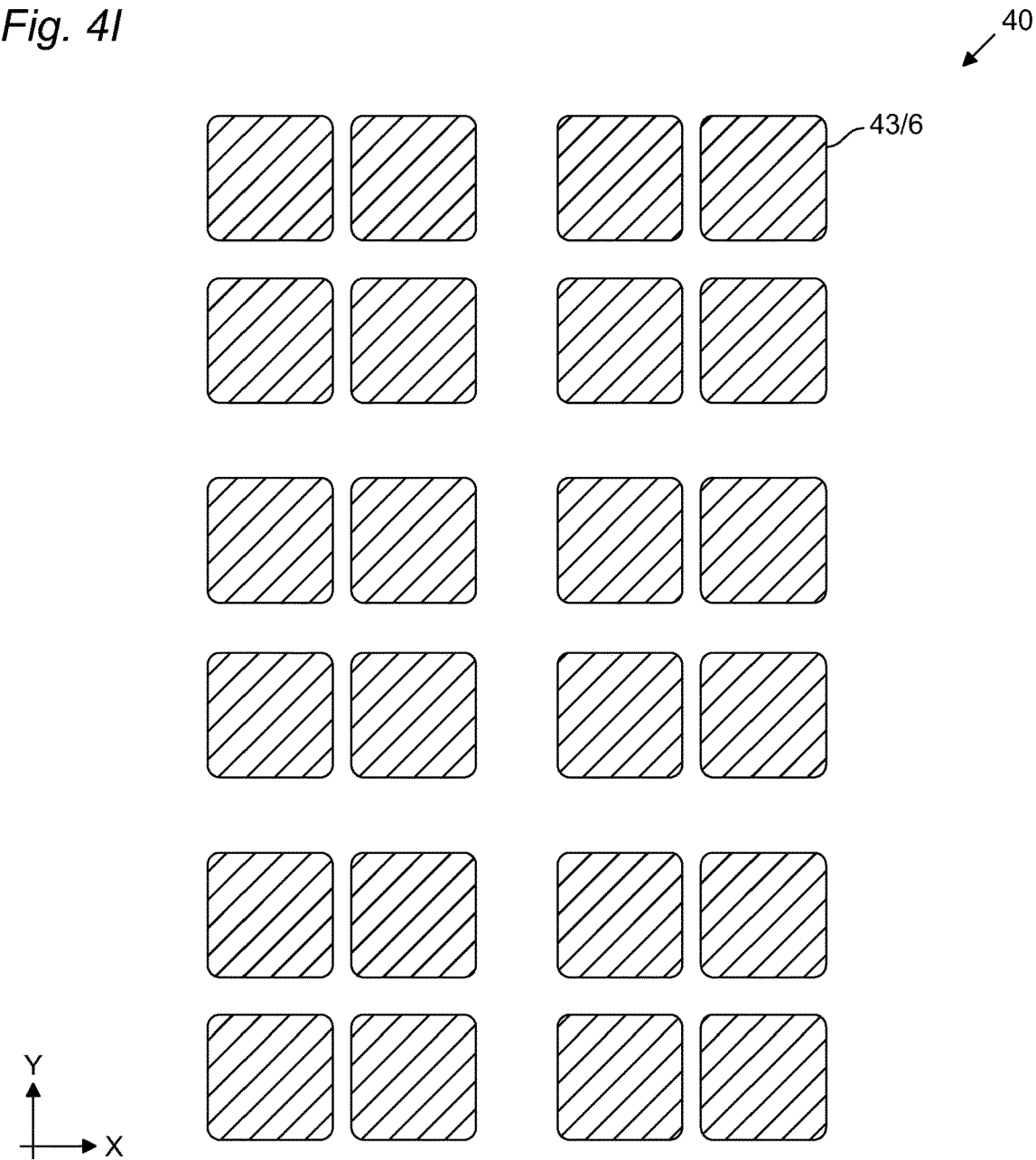
Figure 4J:
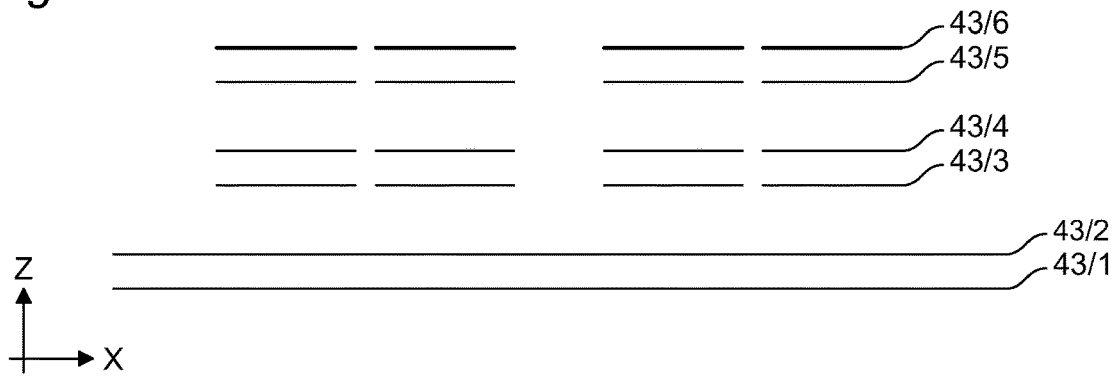
Figure 4K:
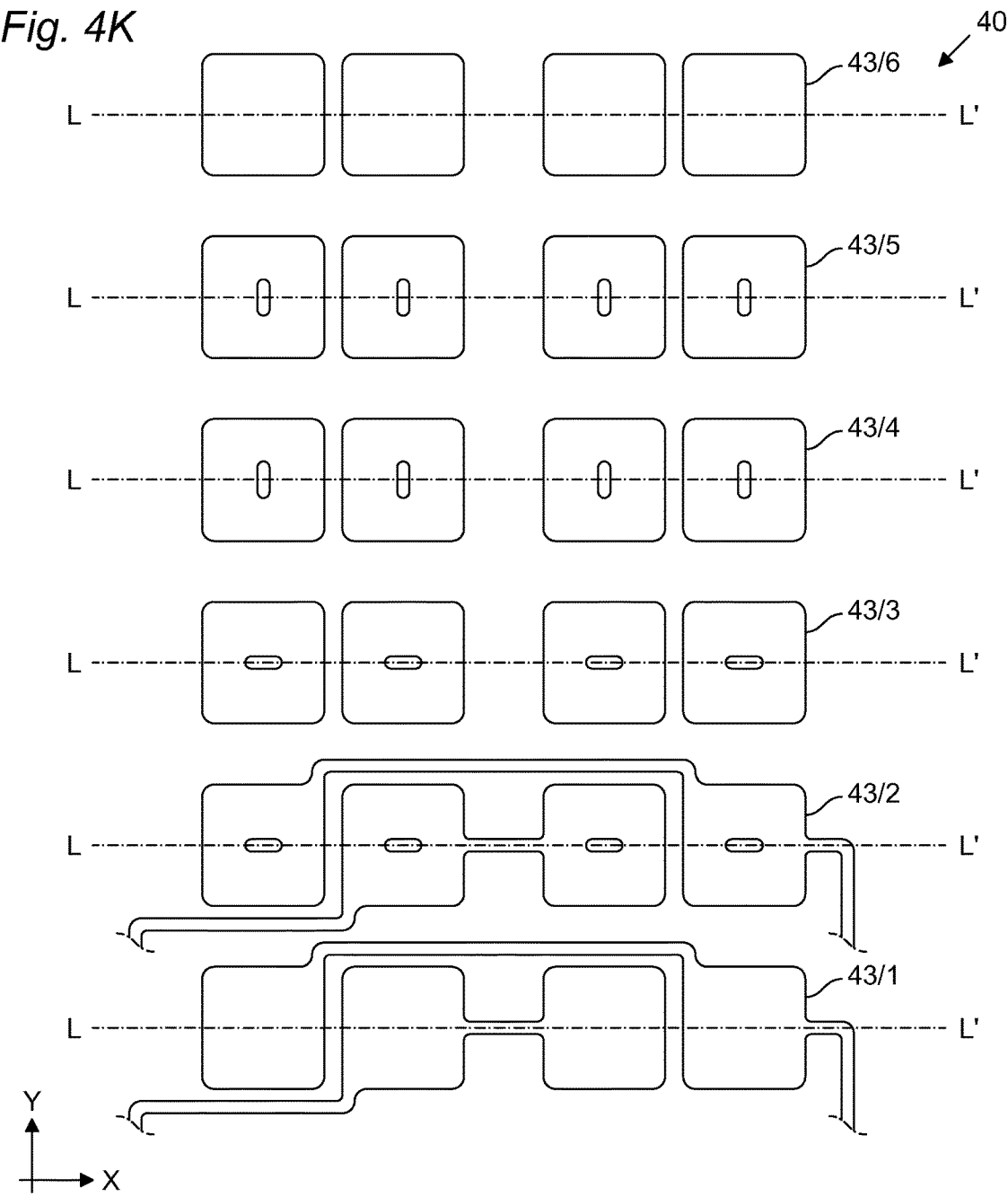
FIG. 4K schematically illustrates a top view of a portion of a plurality of flexible sheets of the pneumatic bladder arrangement 40.
Figure 4K:
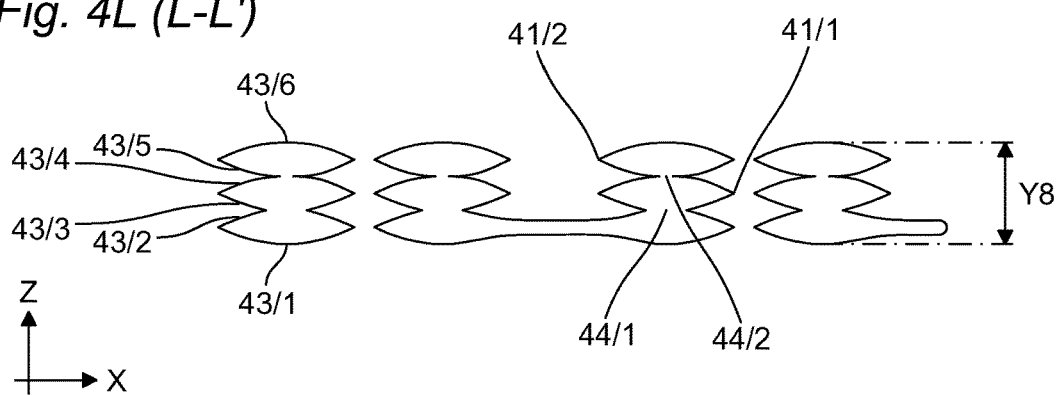

FIG. 4G illustrates a fourth and fifth sheet 43/4-43/5. In this case, it is assumed that the pneumatic bladder arrangement comprises a second overlapping bladder 41/2. In case only the first overlapping bladder 41/1 is desired, the fourth sheet 43/4 can be implemented as illustrated in FIG. 4I while no fifth sheet is needed. In the illustrated implementation, the fourth and fifth sheet 43/4-43/5 are substantially similar to the third sheet 43/3, in that they comprise regions for the implementation of the bladders only. Each of the fourth and fifth sheet, in the implementation with a second overlapping bladder 41/2, comprise a fluid port 44/2.

The fluid port 44/2 is substantially similar to the fluid port 44/1. In some embodiments, it is preferable that the fluid port 44/2 does not completely overlap the fluid port 44/1, so as to avoid sticking of the first bladders during manufacturing and/or operation. This can be achieved, as in the illustrated embodiment, by providing a different orientation for the fluid port 44/2 with respect to the fluid port 44/1. It will be clear that the avoidance of complete overlapping can be achieved in several other manners, such as by implementing the fluid port 44/2 and the fluid port 44/1 with different shape and/or size and/or position.

FIG. 4I illustrates a sixth sheet 43/6. In the illustrated implementation, the sixth sheet 43/65 is substantially similar to the third to fifth sheet 43/3-43/5, except for the lack of fluid ports 44/1.

FIG. 4K schematically illustrates a top view of a portion of a plurality of flexible sheets 43/1-43/6 of the pneumatic bladder arrangement 40 while FIG. 4L schematically illustrates a section view of the pneumatic bladder arrangement 40 along line L-L' of FIG. 4K when bonded together.

As can be seen, the sheets 43/3-43/4 allow the implementation of a plurality of first overlapping bladders 41/1, overlapping the plurality of bladders previously described, for instance any of bladders 11/11-11/23, 21/11-21/46, 31/1S-31/4S. The first overlapping bladders 41/1 can be connected to the lower bladders by means of the fluid port 44/1. This is particularly advantageous in that the fluid port both provides a fluid connection for enabling the inflation/deflation of the first overlapping bladders 41/1 as well as a mechanical connection for maintaining the first overlapping bladders 41/1 in place. The latter is particularly advantageously implemented when the fluid port 44/1 is placed substantially centrally in the bladders.

Similarly, in the illustrated implementation, the sheets 43/5-43-6 allow implementation of a plurality of second overlapping bladders 41/2, overlapping the plurality of first overlapping bladders 41/1.

Adjacent sheets are thus connected to form the fluid structures, such as bladders, fluid supply connections and/or fluid interconnections, or to form the fluid ports 44/1, 44/2. In this manner, any number of overlapping bladders can be implemented, thus allowing any thickness difference Y8 between the inflated and the deflated configuration to be achieved. In preferred embodiments, the value of Y8 can be preferably comprised between 1 and 25 cm, even more preferably between 3 and 10 cm, measured without a force acting on it, that is, without the weight of the user being placed on it.

While in the illustrated embodiment the first and second overlapping bladders 44/1, 44/2 are both located above the previously described bladders, the present invention is not limited thereto. Alternatively, or in addition, one or more overlapping bladders 44/1, 44/2 can be located below the previously described bladder.

Additionally, while in the illustrated embodiment only the bladders have an overlapping structure, a similar configuration could be implemented by the fluid connections and/or fluid interconnections. That is, any of the fluid connections and/or of the fluid interconnections could be realized in an overlapping manner.

Figure 5A:
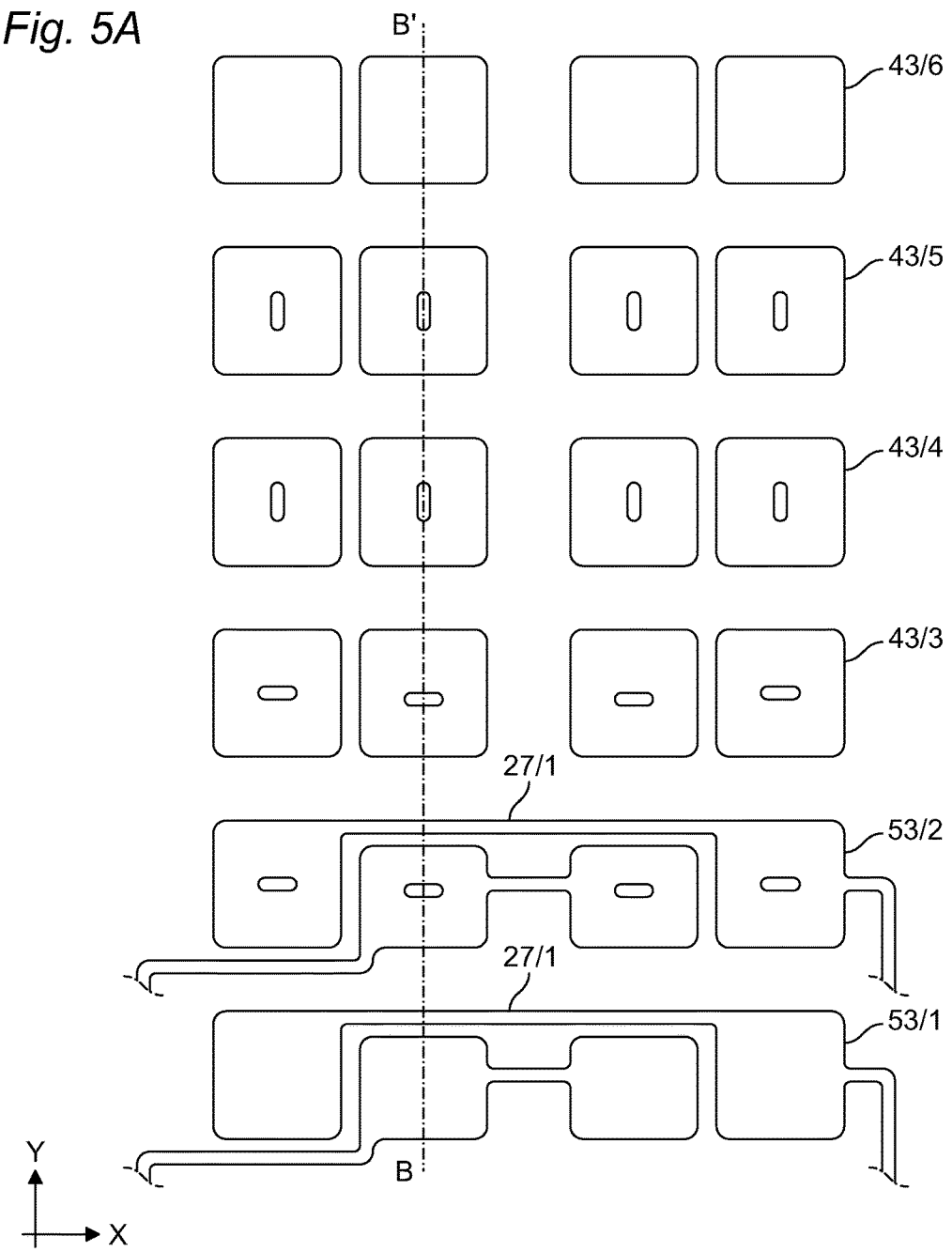
FIG. 5A schematically illustrates a top view of a portion of a plurality of flexible sheets of the pneumatic bladder arrangement 50.
Figure 5A:
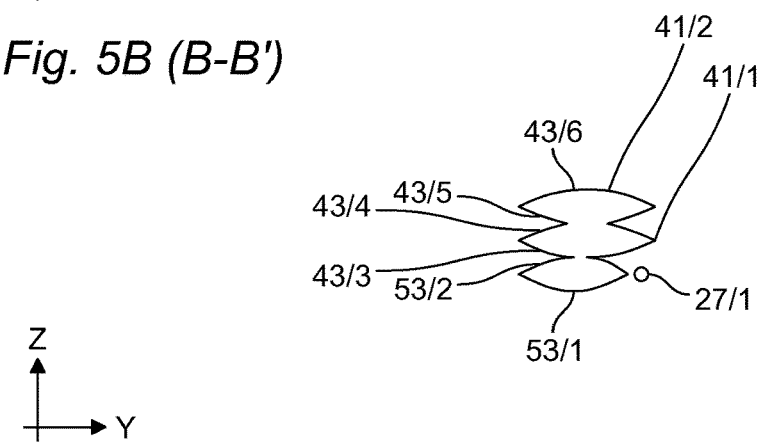

Moreover, while in the illustrated embodiment the overlapping bladders 41/1, 41/2 have substantially the same size as the bladders on which they overlap, the present invention is not limited thereto. In particular, as visible in FIGS. 5A and 5B, a pneumatic bladder arrangement 50 could be configured so that the bladders implemented at the same level of the fluid connections and/or fluid interconnections could have a size smaller than the overlapping bladders. Preferably, in some embodiments, a dimension of at least one bladder at a level without fluid connections and/or fluid interconnections can be configured so as to substantially correspond to the sum of a dimension of a fluid connection and/or a fluid interconnection and a dimension of a bladder adjacent to the fluid connection and/or fluid interconnection. Preferably, the dimensions are all measured in the same direction. In some embodiments, the term substantially can here be interpreted to mean that if a first dimension is within the range of 70% to 130%, preferably 85% to 115%, of a second dimension, the first and second dimension substantially correspond.

In the illustrated embodiment this is the case for the bladder implemented at the level of flexible sheets 53/1, 53/2, which is also the level implementing the fluid connections and fluid interconnections. As can be seen, the bladder in columns C2 and C3 have a dimension, along direction Y, which is smaller than the dimension of the respective bladders implemented at the level of flexible sheets 43/3-43/6. Specifically, along direction Y, the sum of the dimensions of the lowest bladder and of the fluid interconnection 27/1 is substantially corresponding to the dimension of the higher bladders. This is particularly advantageous as it allows, when seen from above as in FIG. 5A, a larger portion of the area of the pneumatic bladder arrangement to be available for ventilation. Although this example has been provided with reference to fluid interconnection 27/1, and in the direction Y, it will be clear that the same approach can be applied in different directions and to various fluid interconnections and/or fluid supply connections.

The above described embodiments thus provides various possible implementations for implementing a pneumatic bladder arrangement 10, 20, 30, 40, 50 which can be configured as support arrangement for a backrest of a seat such that, when installed in the backrest of the seat, the array of bladders covers most of the backrest. Similarly, the pneumatic bladder arrangement can be configured as support arrangement for any of a seat, a footrest, a headrest or a neck portion of a seat such that, when installed in the respective portion of the seat, the array of bladders covers most of the respective portion of the seat.

In particular, thanks to the advantageous routing of the fluid supply connections and interconnections, it is possible to allow the bladders to cover most of the backrest, or the respective mounting part of the seat, thus offering the user the possibility to configure the position and/or a massage function for most of the user's back, and/or upper legs, and/or lower legs, and/or head, and/or neck, and not only at limited locations. Moreover, by implementing the fluid supply connections on the side of the pneumatic bladder arrangement it is possible to realize them with any given length and route them through the foam in the seat. The routing can be preferably toward a location of the seat comprising a fluid source and/or a control device, preferably further away from the back of the user with respect to the pneumatic bladder arrangement.

Figure 6:
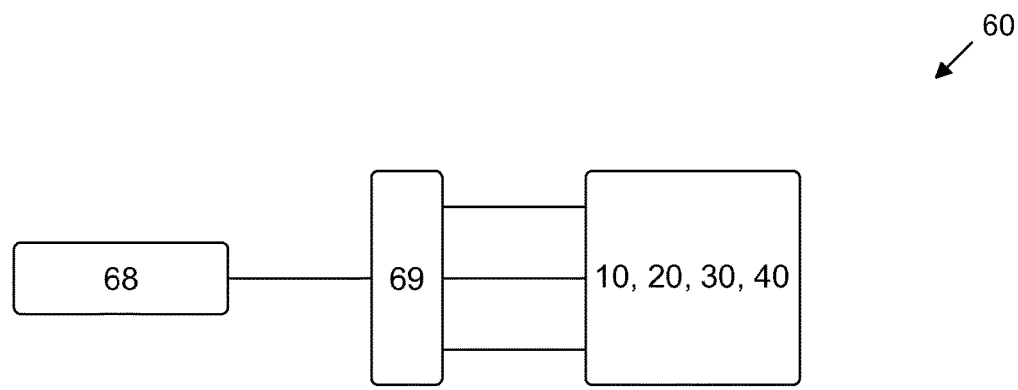
FIG. 6 schematically illustrates a support apparatus 60.

FIG. 6 schematically illustrates a support apparatus 60 for a seat comprising the pneumatic bladder arrangement 10, 20, 30, 40, 50. The support apparatus further comprises a fluid source 68 for supplying a fluid to the plurality of bladders of the pneumatic bladder arrangement. In some implementation, fluid can be preferably air. The fluid source 68 can preferably be a pump. The support apparatus further comprises a control device 69 for controlling the supply of the fluid to the plurality of bladders. In some embodiments, the control device can be implemented by a plurality of valves controlling connection of the fluid source 68 and one or more of the bladders through one or more of the fluid supply connections. The control device 69 can further comprise an electronic controller for controlling operation of the valves and/or of the fluid source 68. Alternatively, or in addition, the controller can be placed remotely and connected to the control device 69 and/or fluid source 68.

In some embodiments, the connection between the fluid supply connections and the control device 69 and/or fluid source 68 can be obtained by means of pipes, for instance rubber or plastic pipes, which can be routed from the terminal portion of the fluid supply connections to the control device 69 and/or fluid source 68. Preferably, the pipes can be welded to the fluid supply connections at their terminal section on the side of the pneumatic bladder arrangement and then routed through appropriate slots in the foam of the seat. This is particularly advantageous as it allows the pipes to be routed mainly on the side of the seat, where they are less likely to be felt by the user and where there is less wear caused by the user's movement and weight on the seat. This increases the reliability of the support apparatus, and particularly at the connection of the fluid supply connections and of the pipes.

The support apparatus 60 can thus configured as a support apparatus 60 for any of a backrest, cushion, footrest, or headrest or a neck portion of the seat. Preferably for a seat used in transportation device such as, for instance, a car, a bus, a train, a boat or a plane. Preferably, in some embodiments, the fluid source 68 and the control device 69 are also integrated in the seat. Even more preferably, at least one of each is present in each seat. Alternatively, or in addition, at least two seats can share a single fluid source 68 and/or control device 69.

Thanks to this arrangements, the control device 69 can be configured to control the supply of the fluid to the plurality of bladders of the pneumatic bladder arrangement, for instance by the electronic controller, preferably as a function of an input from the user of the seat and/or by one or more sensors. Such sensors might measures, for instance, the fluid pressure at any part of the pneumatic bladder arrangement, and/or presence of the user on the seat, and/or the weight of the user, and/or the weight distribution of the user on the seat. It might also be possible to control the bladders as a function of preferences inputted or stored by the used in the electronic controller.

In this manner, it is possible to control inflation and/or deflation of one or more of the bladders according to the requirements of the user and/or a predetermined massage pattern. In the following exemplary massage patterns will be described with reference to an implementation in the back of a seat so as to implement a back massage. It will be clear that analogous applications can be implemented at a cushion for the upper legs, at a footrest for the lower legs, at a headrest for the head, and at a neck portion for the neck.

In particular, the number of bladders as well as their positioning allows implementing a massage pattern such that it creates a massage effect from a bottom of the pneumatic bladder arrangement to a top of the pneumatic bladder arrangement. As an example, with reference to the exemplary embodiment of FIG. 2B, it is possible to control the bladders so as to inflate in the following order:

21/16, 21/26, 21/36, 21/46=>21/15, 21/25, 21/35, 21/45=>21/14, 21/24, 21/34, 21/44=>21/13, 21/23, 21/33, 21/43=>21/12, 21/22, 21/32, 21/42=>21/11, 21/21, 21/31, 21/41

This creates a massage pattern raising from the bottom toward the top of the back of the user. Depending on the configuration of the user, and/or a predetermined configuration of the electronic controller, or by detecting the height of the user thanks to the sensor, it is also possible to exclude some of the rows from the pattern. For instance, for a smaller user, as indicated by the user or detected by a sensor, row R1 might be excluded. In some embodiments, during or after one row has been inflated, the previously inflated row can be deflated. In some embodiments, the previous pattern can be limited to a subset of rows, for instance for providing a localized massage to the lower back, the lumbar portion, the higher back, or the shoulders.

Alternatively, the massage pattern can be configured such that it creates a massage effect in a diagonal direction from a bottom of the pneumatic bladder arrangement to a top of the pneumatic bladder arrangement. As an example, with reference to the exemplary embodiment of FIG. 2B, it is possible to control the bladders so as to inflate in the following order:

21/26, 21/36=>21/15, 21/45=>21/25, 21/35=>21/14, 21/44=>21/24, 21/34=>21/13, 21/43=>21/23, 21/33=>21/12, 21/42=>21/22, 21/32=>21/11, 21/41=>21/21, 21/316=>21/11, 21/41

The previous considerations for the massage pattern in the raising direction also apply to this massage patterns in the diagonal direction.

Still alternatively, the massage pattern can be configured such that, when the pneumatic bladder arrangement is installed in the seat, it creates a massage effect in a diagonal direction along muscle fibers of a person sitting on the seat. Still alternatively, the massage pattern can be such that it creates a rotary massage effect.

In general, it will be clear that, thanks to the relatively high number of bladders, compared to known products, various massage patterns and/or seat configurations can be implemented. Moreover, as can be evidenced from the exemplary patterns above, thanks to the presence of the fluid interconnections, those patterns can be obtained with a reduced number of fluid supply connections and a respective reduced number of control valves. For instance, massage pattern 21/26, 21/36=>21/15, 21/45=>21/25, 21/35=>21/14, 21/44=>21/24, 21/34=>21/13, 21/43=>21/23, 21/33=>21/12, 21/42=>21/22, 21/32=>21/11, 21/41=>21/21, 21/316=>21/11, 21/41 is felt by the user as a succession of twenty different movements. That is, for instance, the first two steps 21/26, 21/36=>21/15, 21/45 are felt two diagonal movements in diverging directions. Those twenty different movements can be obtained by acting only on twelve fluid supply connections, in particular:

22/36=>22/45=>22/25=>22/14=>22/34=>22/43=>22/23=>22/12=>22/32=>22/41=>22/21=>22/41 instead of requiring twenty separate fluid supply connections, which would increase the complexity of the pneumatic bladder arrangement and of the control device 69.

Moreover, by providing a large number of bladders it is possible to provide a larger number of pressure points, with a smaller size, than compared to the prior art. This provides the beneficial effect that the massage patterns can have a higher resolution in terms of pressure points, thus not only enabling more patterns to be implemented but also allowing specific punctual pressure points to be implemented, which mimic the use of fingers by professional masseurs. Moreover, as the bladders are controllable independently of each other, the size and focus of the various pressure areas can be controlled independently.

The present invention can thus result in a seat comprising the support apparatus 60, which is advantageously configurable for a user and capable of providing a large variety of massage patterns in an effective manner.

An embodiment of the invention further relates to a method of manufacturing a pneumatic bladder arrangement comprising positioning a first flexible sheet of material, for instance sheet 13/1, 43/1, adjacent to a second flexible sheet of material, for instance sheet 13/2, 43/2. The method can further comprise welding the first flexible sheet of material to the second flexible sheet of material to form a plurality of bladders arranged in an array of rows and columns. The array can comprise a first array section S1 and a second array section S2 with the first S1 and second S2 array sections each comprising at least one column of bladders. In particular, the method can be configured to manufacture any of the pneumatic bladder arrangement described above.

LIST OF REFERENCE NUMERALS

10: pneumatic bladder arrangement
11/11-11/23: bladder
12/11-12/23: fluid supply connection
13/1-13/2: flexible sheet
14/11-14/23: fluid port
C1-C2: column
R1-R3: row
S1-S2: array section
20: pneumatic bladder arrangement
21/11-21/46: bladder
22/11-22/45: fluid supply connection
24/11-24/46: fluid port
25, 25/11-25/45: connection element
27/1-27/12: fluid interconnection
C1-C4: column
G1/1-G2/3: group
R1-R6: row
X1-X3, Y1-Y5: distance
30: pneumatic bladder arrangement
31/1S-31/4S: bladder
32/1S-32/4S: fluid supply connection
37/1S-37/2S: fluid interconnection
G1/S-G2/S: group
RS: row
Y6: distance
40: pneumatic bladder arrangement
41/1: first overlapping bladder
41/2: second overlapping bladder
43/1-43/6: flexible sheet
44/1, 44/2: fluid port
Y7, Y8: distance
50: pneumatic bladder arrangement
53/1-53/2: flexible sheet
60: support apparatus
68: fluid source
69: control device

The invention claimed is:

1. A pneumatic bladder arrangement comprising
a plurality of bladders arranged in an array of rows and columns, wherein the array comprises a first array section and a second array section with the first and second array sections each comprising at least one column of bladders,
wherein bladders of the first array section are connected to bladders of the second array section by a plurality of fluid interconnections, and
wherein the plurality of fluid interconnections provide interconnections of the bladders so that, for a given row, at least two bladders on internal columns, and at least two bladders on external columns, can be controlled independently.

2. The pneumatic bladder arrangement of claim 1,
wherein the first array section and the second array section of the array each comprises at least two rows of bladders.

3. The pneumatic bladder arrangement of claim 1,
wherein each column of the array comprises at least five bladders.
4. The pneumatic bladder arrangement of claim 1,
wherein the bladders of the first array section are formed between two flexible sheets of material connecting the bladders of the first array section, and
wherein the bladders of the second array section are formed between two flexible sheets of material connecting the bladders of the second array section.
5. The pneumatic bladder arrangement of claim 4,
wherein the bladders of the first array section and the bladders of the second array section are formed between the respective two flexible sheets of material by welding the respective two sheets of material to each other.
6. The pneumatic bladder arrangement of claim 4,
wherein the bladders of the first array section and the bladders of the second array section are formed between the same two flexible sheets of material.
7. The pneumatic bladder arrangement of claim 4,
wherein at least one bladder of the first array section is connected to a first fluid supply connection for supplying fluid to at least one of the bladders of the first array section, the first fluid supply connection being formed between the two flexible sheets of material of the first array section, and
wherein at least one bladder of the second array section is connected to a second fluid supply connection for supplying fluid to at least one of the bladders of the second array section, the second fluid supply connection being formed between the two flexible sheets of material of the second array section.
8. The pneumatic bladder arrangement of claim 4,
wherein the interconnection is formed between the two flexible sheets of material.
9. The pneumatic bladder arrangement of claim 1,
wherein the interconnection extends through the bladders mainly in a row direction.
10. The pneumatic bladder arrangement of claim 1,
wherein the pneumatic bladder arrangement is configured as support arrangement for any of a backrest, a cushion, a footrest, a headrest or a neck portion of a seat such that, when installed in the backrest, cushion, footrest, headrest or neck portion of the seat, the array of bladders covers most of the backrest, cushion, footrest, headrest or neck portion.
11. The pneumatic bladder arrangement of claim 1,
wherein at least one of the first array section and the second array section comprises bladders that are grouped in a group of at least four bladders arranged in two adjacent rows and in two adjacent columns of the array.
12. The pneumatic bladder arrangement of claim 11,
wherein the at least four bladders in the group are spaced from one another by a distance that is less than a distance to an adjacent bladder not being part of the group.
13. The pneumatic bladder arrangement of claim 11,
wherein the first array section and the second array section each comprise at least two groups of four bladders.
14. The pneumatic bladder arrangement of claim 11,
wherein the first array section and the second array section each comprise at least one additional group of two bladders arranged in one row of the array.

15. The pneumatic bladder arrangement of claim 1,
wherein the bladders of the plurality of bladders have a similar shape.
16. The pneumatic bladder arrangement of claim 15,
wherein the bladders of the plurality of bladders each have a rectangular shape.
17. The pneumatic bladder arrangement of claim 1,
wherein at least one bladder of the plurality of bladders has an area comprised between 4 $cm^2$ and 200 $cm^2$.
18. The pneumatic bladder arrangement of claim 1,
wherein the bladders of the first array section each have a first fluid port to allow each bladder of the first array section to be inflated with fluid or to be deflated independently of the other bladders of the first array section; and/or
wherein the bladders of the second array section each have a first fluid port to allow each bladder of the second array section to be inflated with fluid or to be deflated independently of the other bladders of the second array section.
19. The pneumatic bladder arrangement of claim 18,
wherein at least one of the bladders of the first array section has a second fluid port in connection with a first fluid port of one of the bladder of the second array section; and/or
wherein at least one of the bladders of the second array section has a second fluid port in connection with a first fluid port of one of the bladder of the first array section.
20. The pneumatic bladder arrangement of claim 1,
wherein at least one element for the supply or distribution of fluid to the plurality of bladders is provided or formed between two flexible sheets of material by welding the respective two sheets of material to each other.
21. The pneumatic bladder arrangement of claim 1,
further comprising a plurality of first overlapping bladders respectively overlapping the plurality of bladders.
22. The pneumatic bladder arrangement of claim 21,
further comprising a plurality of second overlapping bladders respectively overlapping the plurality of first overlapping bladders.
23. A support apparatus for a seat comprising
the pneumatic bladder arrangement of claim 1;
a fluid source for supplying a fluid to the plurality of bladders of the pneumatic bladder arrangement; and
a control device for controlling the supply of the fluid to the plurality of bladders.
24. The support apparatus of claim 23,
wherein the support apparatus is configured as a support apparatus for a backrest, a cushion, a footrest, a headrest or a neck portion of the seat.
25. The support apparatus of claim 23,
wherein the control device is configured to control the supply of the fluid to the plurality of bladders such that the bladders of the plurality of bladders are inflated with the fluid and deflated according to a predetermined massage pattern.
26. The support apparatus of claim 25,
wherein the massage pattern is such that it creates a massage effect from a bottom of the pneumatic bladder arrangement to a top of the pneumatic bladder arrangement.
27. The support apparatus of claim 25,
wherein the massage pattern is such that it creates a massage effect in a diagonal direction from a bottom of the pneumatic bladder arrangement to a top of the pneumatic bladder arrangement.

28. The support apparatus of claim 25,
wherein the massage pattern is such that, when the pneumatic bladder arrangement is installed in the seat, it creates a massage effect in a diagonal direction along muscle fibers of a person sitting on the seat.

29. The support apparatus of claim 25,
wherein the massage pattern is such that it creates a rotary massage effect.

30. A seat comprising the support apparatus of claim 24.

31. A method of manufacturing a pneumatic bladder arrangement, comprising:
positioning a first flexible sheet of material adjacent to a second flexible sheet of material; and
welding the first flexible sheet of material to the second flexible sheet of material to form a plurality of bladders arranged in an array of rows and columns, wherein the array comprises a first array section and a second array section with the first and second array sections each comprising at least one column of bladders;
wherein the pneumatic bladder arrangement includes a plurality of bladders arranged in an array of rows and columns, wherein the array comprises a first array section and a second array section with the first and second array sections each comprising at least one column of bladders;
wherein bladders of the first array section are connected to bladders of the second array section by a plurality of fluid interconnections; and
wherein the fluid interconnections provide interconnections of the bladders so that, for a given row, at least two bladders on internal columns, and at least two bladders on external columns, can be controlled independently.

* * * * *